RECORD READER

Filed May 24, 1962 13 Sheets-Sheet 1

INVENTORS.
NORMAN J. ROSEN
ROBERT H. LEWIS
HOWARD C. STANLEY

BY Christie, Parker & Hale

ATTORNEYS.

Sept. 5, 1967 N. J. ROSEN ETAL 3,340,384

RECORD READER

Filed May 24, 1962 13 Sheets-Sheet 2

Sept. 5, 1967 N. J. ROSEN ETAL 3,340,384

RECORD READER

Filed May 24, 1962

13 Sheets-Sheet 3

INVENTORS.
NORMAN J. ROSEN
ROBERT H. LEWIS
HOWARD C. STANLEY

BY Christie, Parker & Hale

ATTORNEYS.

RECORD READER

Filed May 24, 1962

INVENTORS.
NORMAN J. ROSEN
ROBERT H. LEWIS
HOWARD C. STANLEY
BY
Christie, Parker & Hale
ATTORNEYS.

Sept. 5, 1967 N. J. ROSEN ETAL 3,340,384

RECORD READER

Filed May 24, 1962

13 Sheets-Sheet 5

INVENTORS.
NORMAN J. ROSEN
ROBERT H. LEWIS
HOWARD C. STANLEY

BY Christie, Parker & Hale

ATTORNEYS.

INVENTORS.
NORMAN J. ROSEN
ROBERT H. LEWIS
HOWARD C. STANLEY
BY
Christie, Parker & Hale
ATTORNEYS.

Sept. 5, 1967 N. J. ROSEN ET AL 3,340,384

RECORD READER

Filed May 24, 1962 13 Sheets-Sheet 7

INVENTORS
NORMAN J. ROSEN
ROBERT H. LEWIS
HOWARD C. STANLEY
BY
Christie, Parker & Hale
ATTORNEYS.

INVENTORS.
NORMAN J. ROSEN
ROBERT H. LEWIS
HOWARD C. STANLEY
BY
Christie, Parker & Hale
ATTORNEYS.

INVENTOR
NORMAN J. ROSEN
ROBERT H. LEWIS
BY HOWARD C. STANLEY
Christie, Parker & Hale
ATTORNEYS United States Patent Office 3,340,384

Patented Sept. 5, 1967

3,340,384

RECORD READER

Norman J. Rosen, Altadena, Robert H. Lewis, West Covina, and Howard C. Stanley, Glendora, Calif., assignors, by mesne assignments, to Giannini Controls Corporation, Duarte, Calif., a corporation of New York Filed May 24, 1962, Ser. No. 198,685
18 Claims. (Cl. 235—61.11)

This application is a continuation-in-part of our earlier filed application entitled, Record Reader, filed on Sept. 1, 1960, bearing Ser. No. 53,538, and assigned to the same assignee as the present application, and now abandoned.

This invention relates to data processing systems and more particularly to readers for record members or cards having information recorded thereon in terms of perforations for providing electrical indications thereof to be used in a data processor.

Data processing systems utilizing information derived from perforated record members or cards have been devised for many applications. In general, the perforated record cards have been read or processed in large volumes at high speeds. The advantages of the punched record data processing system have made it desirable to use the perforated record member for monitoring production lines in industrial processing systems and the like. The monitoring of manufacture in this fashion would be provided by an operator transmitting information representative of the status or the condition of the manufacture at preselected stations and at preselected intervals whereby the information transmitted by any one operator or operators are all received by a central data processor. The data processor, in turn, operates on the information to give the desired over-all indication of the manufacture and allow any changes that may be needed to be transmitted to the operator. This type of monitoring operation has led to a demand for an inexpensive punched record reader, preferably portable, that may be utilized in a plurality of remote locations for such monitoring purposes.

This invention provides an improved, compact, more reliable and inherently less expensive record reader than was heretofore possible. The record reader utilizes a novel sensing construction whereby no electrical contacts are provided through the record member itself. This purely mechanical sensing arrangement prevents the contamination of the electrical sensing contacts with foreign substances introduced into the reader by means of the record members and thereby results in substantially trouble-free operation. The reader is further constructed and defined whereby the electrical portions thereof are not exposed to the operator and thereby are not subject to tampering. The sensing construction of the record reader allows an appreciable reduction in the number of sensing elements and conductive buses for reading a record member in comparison with similar devices heretofore proposed. This reduction in parts not only results in an inexpensive but also an easily maintained and serviced reader.

In one embodiment of the invention the reader is arranged for reading record members or cards arranged with a preselected number of rows or columns for recording information in terms of perforations in a particular row and column. This embodiment of the reader includes a record member or card receiving tray mounted for sliding movement into and out of a reading position. The slidable tray is merely exposed an amount to receive the record member, while the remainder of the reader is completely housed. The record card receiving tray is provided with a plurality of row grooves corresponding to the number of rows on the record member to be read and which grooves are spaced apart a distance corresponding to the spacing of the rows on the record member. The receiving tray is further defined with a plurality of spaced conductor bars corresponding to the plurality of rows on the record member and which row conductor bars are insulatively spaced apart and also correspond to the spacing between the grooves or the rows on the record member. The row conductor bars may be advantageously constructed and defined by means of printed circuit techniques whereby a smooth surface is provided for the tray. The record member is received on the tray at the grooved portion thereof whereby the rows of the record member overlie the row grooves, row by row. A plurality of electrically conductive column bars are supported in a spaced relationship and arranged transversely to the row conductor bars and which column bars correspond to the number of columns on the record member to be read or the total columnar capacity of the reader. The column conductor bars are insulatively spaced apart and provided with insulative guides for receiving a slidable sensing element. A slidable sensing element is provided for each column bar and is secured in a non-reading position between the guides to slide along the column bars. The sensing element supporting member is arranged to maintain the sensing elements in a releasable, non-reading position when the tray is, in turn, in a non-reading position. Each of the sensing elements is advantageously constructed by means of a pair of conducting elements, each end of which is provided with a sensing finger to engage a recorded perforation, while the associated sensing finger on each conducting element is spaced therefrom to engage a row conductor bar and thereby provide an electrical connection to the individual column bus indicative of the sensed perforation when the tray is in a reading position.

The reliable operation of the reader of this invention results from the provision of the improved sensing element utilized therein. The sensing element in one embodiment comprises a pair of elongated electrical conducting elements defined with protruding sensing fingers at opposite ends thereof for engaging a perforation or a conductor bar. The pair of conducting elements are secured together at a central point in a loose relationship to allow their sensing fingers to be spaced apart a preselected distance. The spacing of the sensing fingers is related to the width of the recording channel or columns on the record member whereby a perforation in a column that is displaced in the direction of a row may be sensed by either sensing finger separately and whereby each sensing finger will separately provide the required electrical current. The central securing member is similarly defined with a pair of sensing fingers protruding in the opposite direction from the mentioned sensing fingers for engaging and sliding along the column buses. These sensing elements are constructed of a material of sufficient resilience to be held under tension and yet of sufficient stiffness to be slidable while in tension, in response to the engagement of a sensing finger with a row groove during the relative movement between the tray and the sensing element mounting means.

These and other features of the present invention may be more fully appreciated when considered in the light of the following specification and drawings, in which:

FIGURE 1 is a perspective view of the reader showing a record member in position to be read embodying the invention;

FIGURE 1*a* is a block diagram of a data processing arrangement showing the relationship with the reader of FIG. 1;

FIGURE 14 is a perspective view of an input station including a modified record reader;

Figures 1, 2:
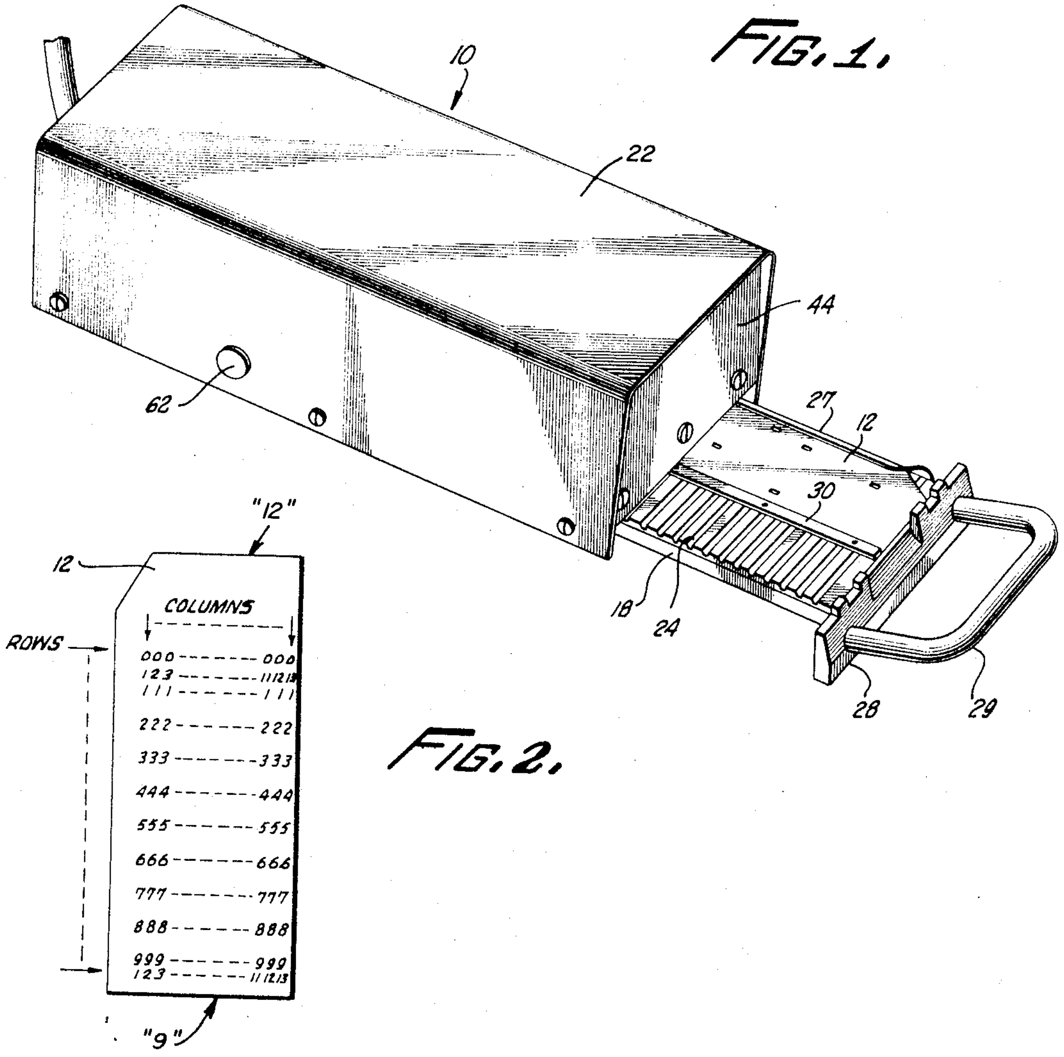
FIGURE 2 is a representation of a typical record member for use with the reader of FIG. 1.

The reader 10 is particularly adapted to read a record member arranged with a preselected number of rows and columns and having coded information recorded thereon in terms of perforations in a particular row and column. A typical record member for the purposes of this invention is shown in FIG. 2 and will be recognized as similar to the standard "IBM" punch card. The record member 12 is arranged with columns extending lengthwise, and the rows are arranged transversely thereto to subdivide the width of the card into approximately twelve rows. This type of record member varies in length in accordance with the required number of columns to be read and may range up to eighty columns in length. The record member 12 is shown with thirteen columns and twelve rows and the reader 10 is adapted for reading record members up to thirty columns and twelve rows.

The reader 10 comprises a supporting member 14 mounting a plurality of perforation sensing elements 16 coacting with a slidable record member receiving tray 18. The supporting member 14 and the tray 18 are arranged on a base 20 and are completely enclosed by means of a U-shaped housing 22. The housing 22 is secured to the base 20 by means of screws or the like to completely enclose the reader 10 when the tray 18 is in a reading position. The only portion of the reader 10 that is exposed to the operator is the portion of the tray 18 receiving the record member 12, as shown in FIG. 1.

The record member receiving tray 18 is constructed of an electrically insulative material and the front end or exposed end is provided with a plurality of transversely aligned grooves, similar to the groove 24, extending the full width of the tray, the number of grooves 24 corresponds to the number of rows on the record member to be sensed. In this instance twelve grooves are shown for sensing each of the twelve rows on the record member 12. An additional groove 26 is arranged adjacent the innermost row groove 24 for detecting the absence of a record card on the tray 18 or the presence of a record card thereon having less than the preselected number of rows, as will be explained more fully hereinafter. The tray 18 is provided with card guides or card retaining elements 27 arranged on opposite sides of the tray 18 and extend from a front wall or plate 28 to the end of the groove 26 to slidably receive a record member. A raised shoulder 29[a] is provided adjacent the inner side of the groove 26 and inside the housing 22 to define a stop for positioning the record member 12. A similar shoulder is provided adjacent the rear edge of the front plate 28 of the tray (not shown). Both of these raised edges or shoulders have a very light clearance to the front plate 28 to prevent the closing of the tray 18 if the record member 12 is displaced so as to rest on these shoulders.

The front wall 28 is provided with a handle 29 secured thereto for positioning the tray 18 into and out of a reading position within the reader 10. The tray 18 is also provided with a barrier 30 that may be mounted intermediate the card guides 27 to accommodate record members, such as the member 12, having less than the preselected thirty columns. The barrier 30 is removably mounted over the row grooves 24 and, in this fashion, will not only accommodate record members of varying column length but may also be arranged to accommodate two or more record members having a total number of columns within the capacity of the columnar width of the tray 18.

A plurality of row conductor bars 32 are also arranged on the tray 18 in a longitudinally spaced relationship relative to the row grooves 24. The row conductor bars 32 correspond in number to the plurality of rows on the record member to be read and thereby correspond to the number of row grooves 24 on the front portion or exposed portion of the tray 18. The row conductor bars 32 are spaced apart a distance substantially equivalent to the spacing of the rows on the record member 12 and are mounted to be exposed and flush with the top surface of the tray 18. The row conductor bars 12 may be constructed and defined in this fashion by means of printed circuit techniques. In addition to the twelve row conductor bars 32, an additional conductor bar 33 may be provided adjacent the outermost conductor bar 32, or the conductor bar 32 corresponding to row twelve of the record member 12. The conductor bar 33 may be utilized for detecting blank columns on the record member 12, as will be described more fully hereinafter. It should, therefore, now be apparent that the top surface of the tray 18 is a substantially smooth surface from end to end with the exception of the provision of the row grooves 24 and is insulated throughout whereby the row conductor bars 32 are electrically isolated from the other portions of the reader 10.

Figure 8:
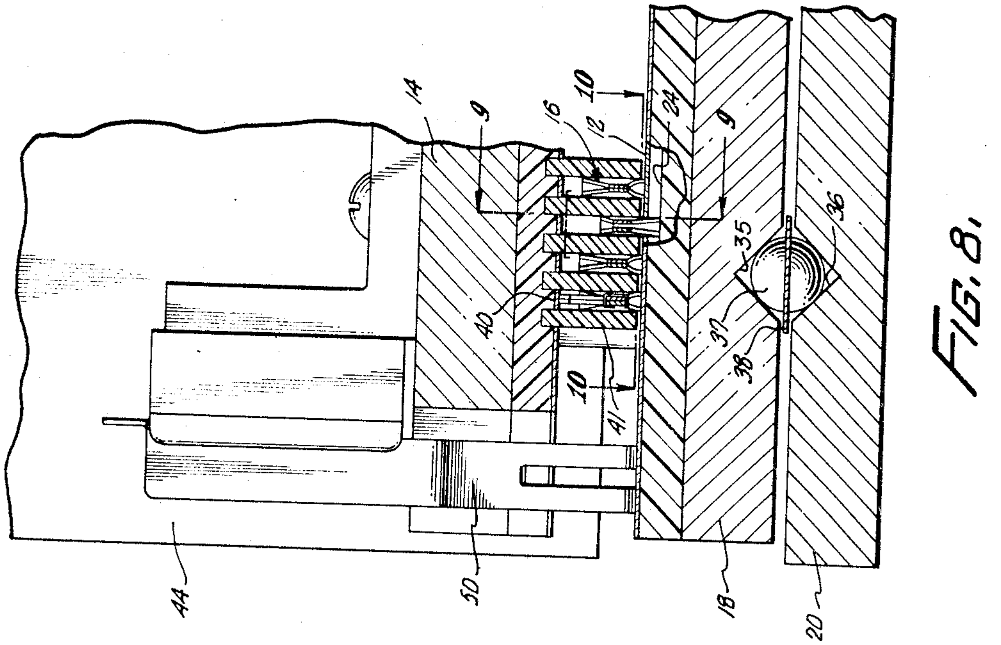
FIGURE 8 is a partial sectional view, with portions broken away and portions in elevation, taken along the line 8—8 of FIG. 3.

The bottom surface of the tray 18 is provided with a pair of V-shaped grooves 35 extending longitudinally thereof and coacting with similar V-shaped grooves 36 provided for the insulative base member or plate 20; see FIG. 8. The V-shaped grooves 35 and 36 accommodate ball bearings 37 retained in cage assemblies 38. Three ball bearings 37 retained in a single cage 38 are shown. This arrangement allows the tray 18 to ride on the ball bearings and to slide lengthwise relative to the base plate 20.

The smooth, top surface of the tray 18 allows the sensing elements 16 carried by the supporting member 14 to smoothly slide thereover and when the record member 12 is arranged on the tray 18 to connect a sensed row conductor bar 32 into electrical engagement with a corresponding column conductor bar individual to that sensing element to provide an electrical indication that a perforation is recorded on the record member 12 in a particular row and column.

Figures 5, 6, 7:
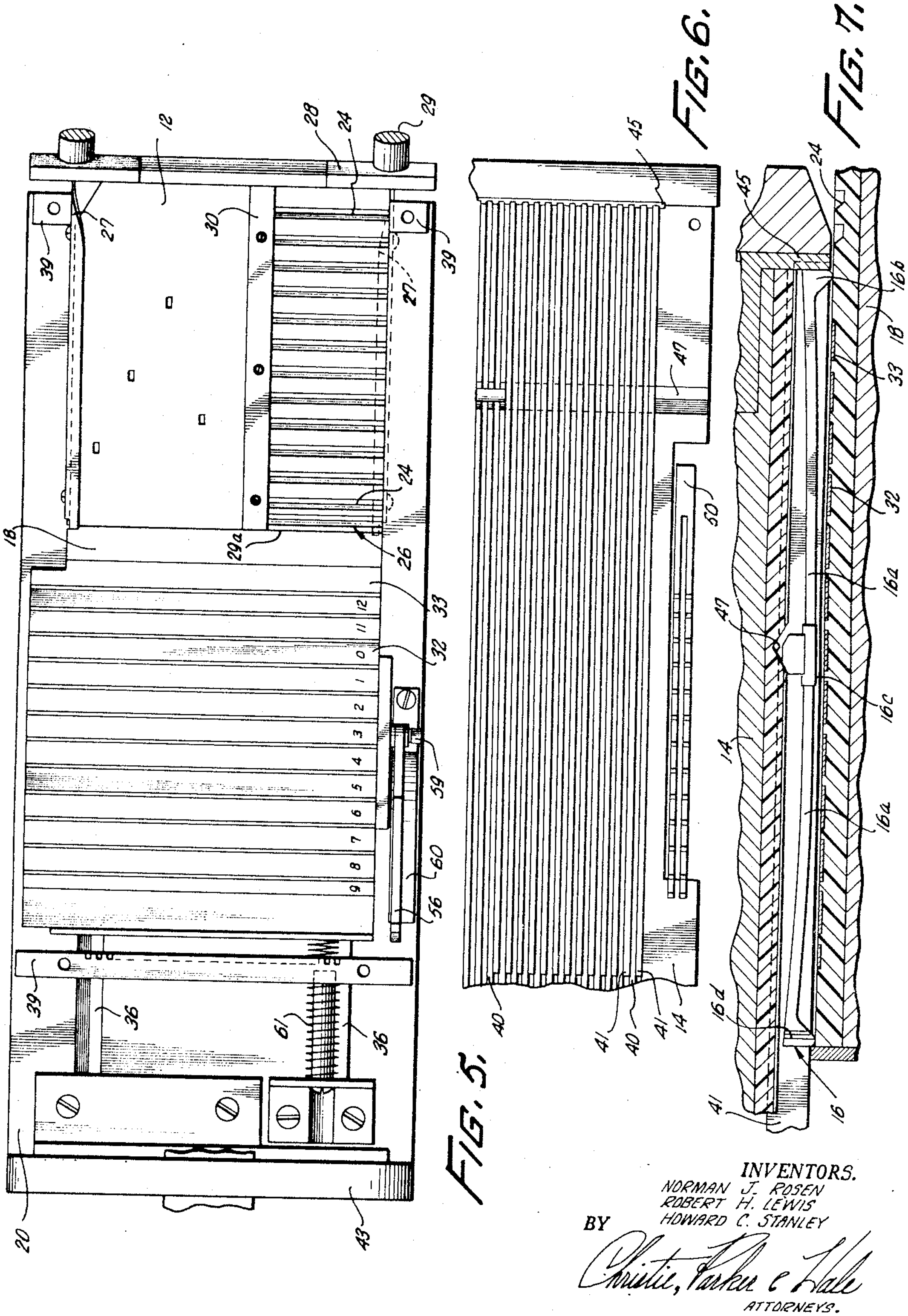
FIGURE 5 is a top plan view of the record member receiving tray shown in a reading position with the record member thereon and the housing and supporting member removed.
FIGURE 6 is a partial bottom plan view of the supporting member showing the column conductor buses.
FIGURE 7 is a partial longitudinal, cross-sectional view of the receiving tray and the supporting member showing the sensing elements in the secured non-read position.

The supporting member 14 is mounted on the base member 20 in a stationary position and in a predetermined spaced relationship with respect to the tray 18 by means of the spacer bars 39 secured to the base 20. This construction allows the tray 18 to slide into and out of reading position with respect to the sensing elements 16 carried by the supporting member 14. One face of the supporting member 14 is arranged with a plurality of longitudinally extending column buses 40. The number of column buses 40 preferably correspond to the width of the tray 18 or the total columnar capacity of the tray. Each of the column buses 40 are arranged in an insulative, spaced-apart relationship corresponding to the spacing of the columns on the record member 12, and also may be manufactured by means of printed circuit techniques. The column buses 40 are arranged on the lower portion of the supporting member 14 to face the top surface of the tray 18. Each of the column buses 40 that are to be utilized for sensing the thirteen columns of the record member 12 are provided with a pair of longitudinally extending, insulative guides 41 arranged on opposite sides and adjacent to these column buses 40. The column buses 40 may then be considered as an overhead track for the sensing elements 16 and are constructed and defined to guide and insulate the sensing elements 16 from the remaining sensing elements and column buses. The portion of the supporting member 14 shown in FIG. 6 is arranged with only thirteen of the column buses 40 provided with the guides 41 to correspond with the thirteen column record member 12. It will be apparent that the remaining column buses 40 may be similarly provided with guides 41 or some of the guides and/or sensing elements 16 removed when different sized record members are to be read.

Figure 1A:
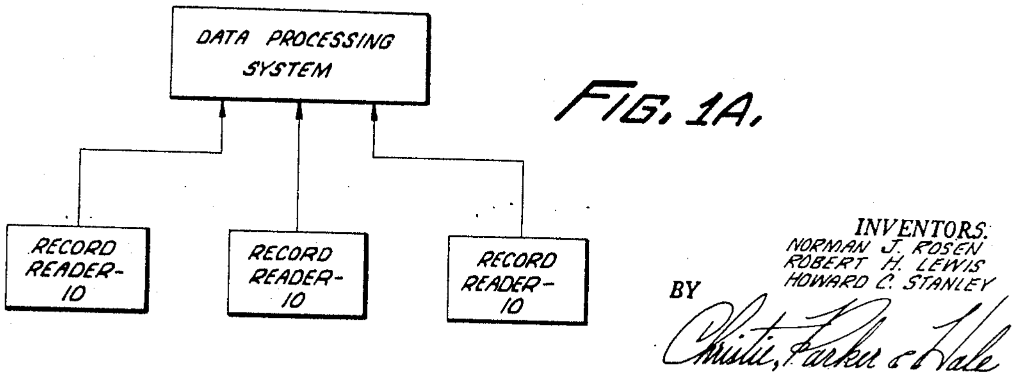

Each of the column buses 40 have their inner ends connected to a separate electrical terminal, similar to terminal 42, and which terminals are, in turn, each provided with a separate lead wire, connected and harnessed together to an electrical connector for use with a cable extending through the rear plate 43. The rear plate 43 is secured to the base 20 and acts as a closure for the rear of the U-shaped housing 22. The cable extends to the remotely located data processing system, see FIG. 1*a*. The outer ends of the column buses 40 extend to a front plate 44 which is secured to the supporting member 14 as by screws, and which front plate acts as a closure for the front of the U-shaped housing 22 in combination with the tray 18. The front plate 44 also mounts a conducting bus 45 along its lower edge and which bus is utilized for detecting blank columns on a record member to be read and for locating the sensing elements 16 in a non-read position, as will be more evident hereinafter. The conducting bus 45 extends longitudinally of the plate 44 and is defined with a plurality of notches or grooves for receiving the ends of the sensing element 16, the number of notches corresponding to the number of column conducting buses 40. The supporting member 14 is also provided with an insulative V-shaped groove 47 spaced inwardly from the front plate 44 a preselected distance. The V-shaped groove 47 runs transversely across the supporting member 14 and produces a discontinuity in the portions of the column buses 40 arranged on opposite sides thereof. The groove 47 is utilized to releasably secure the sensing elements 16. The sensing elements 16 are retained in a non-read position by means of the groove 47 and the groove and sensing element are defined relative to one another to allow the sensing elements to be released therefrom upon the production of relative movement between the tray 18 and the supporting member 14.

Figure 3:
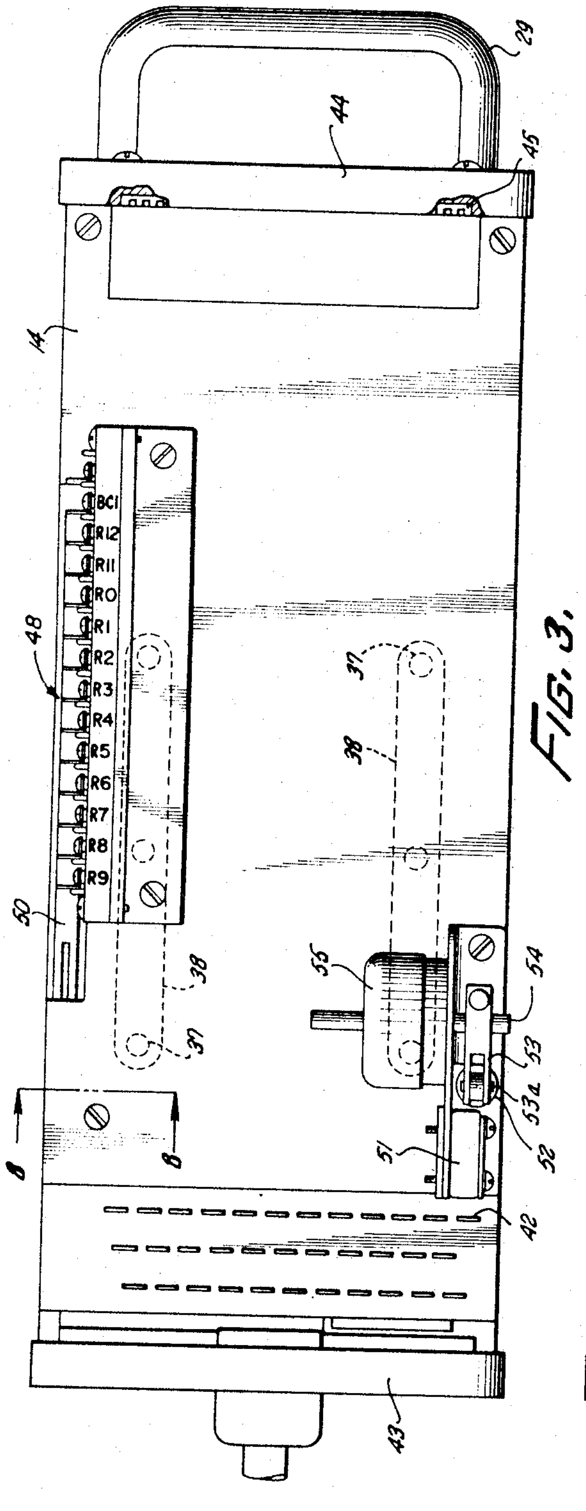
FIGURE 3 is a top plan view of the reader of FIG. 1 with the top cover removed.

A plurality of electrical terminals 48 are arranged on the supporting member 14 on the top side thereof, as illustrated in FIG. 3 and identified as the terminals BC1, R12, R11 . . . R9 in the same sequential order as the rows of the record member 12 are identified. Each of these electrical terminals mount a bifurcated, resilient, angular, conducting element, such as the element 50, and which elements are each suspended from their respective terminals to electrically engage the corresponding row conductor bar 32 when the tray 18 is in a reading position whereby a direct electrical circuit is defined between a row conductor bar and the corresponding row terminal. The row terminal may be electrically connected with the same connector and cable as provided for the column buses 40.

Figure 4:
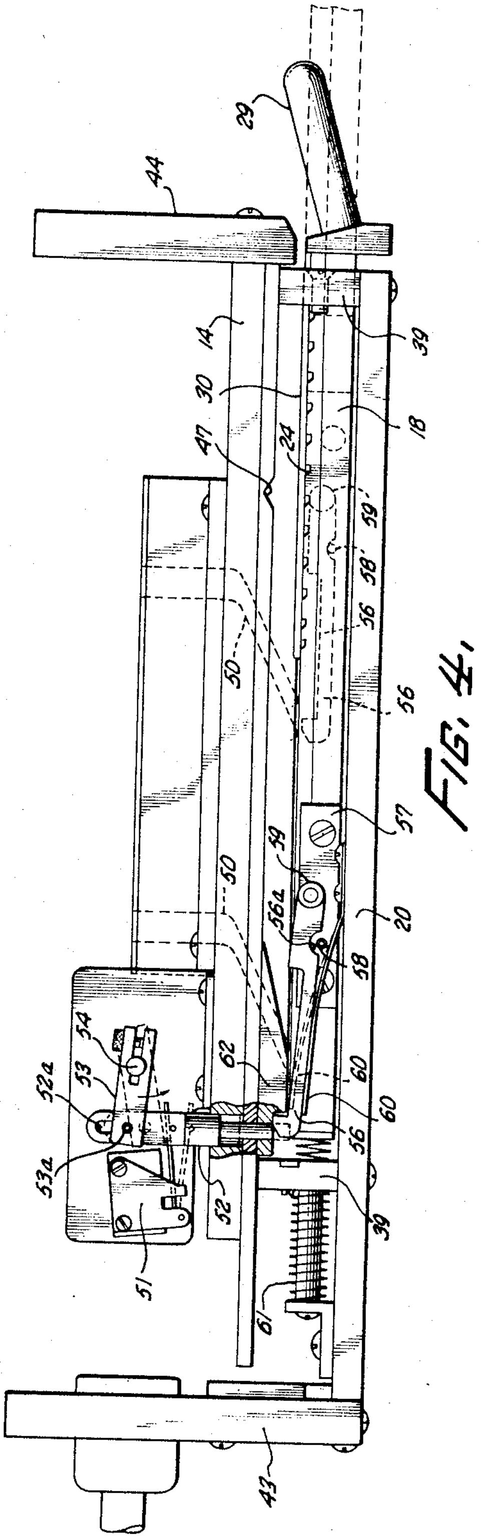
FIGURE 4 is a side elevational view of the reader as shown in FIG. 3.

The supporting member 14 further mounts a microswitch 51 at the opposite side thereof from the row terminals, or on the bottom side, as illustrated, at its inner extremity. The switch 51 is operated in response to a floating pin 52 loosely suspended from an actuating arm 53, in turn clamped to the shaft 54 of a rotary solenoid 55 mounted on member 14. The rotary solenoid 55 is also electrically connected by means of the cable to the data processing system. The actuating arm 53 has a bifurcated end and is clamped to the shaft of the solenoid 55 to be responsive thereto. The opposite end of the arm 53 mounts a pin 53[a] slidable in a guide slot 52[a] provided at one end of the floating pin 52. The opposite end of the floating pin 52 extends through the bottom face of the supporting member 14 by means of the aperture provided therefor and is freely slidable therein. When the floating pin 52 is freely suspended from the pin 53[a], the actuating arm for the microswitch 51 is arranged to maintain the switch in an open circuit condition and the arm assumes the position shown in dotted outline. Upon the floating pin 52 being raised to the position indicated in FIG. 4, the arm is raised to the switch closing position indicated.

The bottom face of the floating pin 52 engages a pawl 56 pivotally mounted to the left hand side of the tray 18 and movable therewith. This side of the tray 18 is provided with a stop pin 58 to engage the undercut portion 56[a] of the pawl 56 to hold the pawl in a horizontal position. The stop pin 58 is mounted adjacent the pivot pin 59 for the pawl 56. The engagement of the floating pin 52 and the pawl 56 limit the downward travel of the floating pin 52. A flat, cantilevered spring 60 is secured to the base 20 and is inclined to engage the rear end of an inclined cam 62 suspended from the member 14. The spring 60 and cam 62 are defined to constrain the pawl 56 so as to engage the bottom end of the floating pin 52 as the tray 18 is positioned into a reading position within the housing 22. When the tray 18 is fully within the reader 10 the pawl 56 engages the back end of the cam 62, raises the pin 52, and locks the tray 18 into reading position.

A helical compression spring 61 is secured to the base 20 between the rear plate 43 and the spacer bar 39, extending through an aperture provided in the bar 39 into the path of the tray 18 to engage the rear thereof. The spring 61 is carried by a rod secured to the base 20 by means of a bracket. The spring 61 is of sufficient compressive strength to allow it to eject the tray 18 outwardly to a non-read position when the pawl 56 is released to indicate to the operator the non-read condition of the reader 10.

Figures 9, 10:
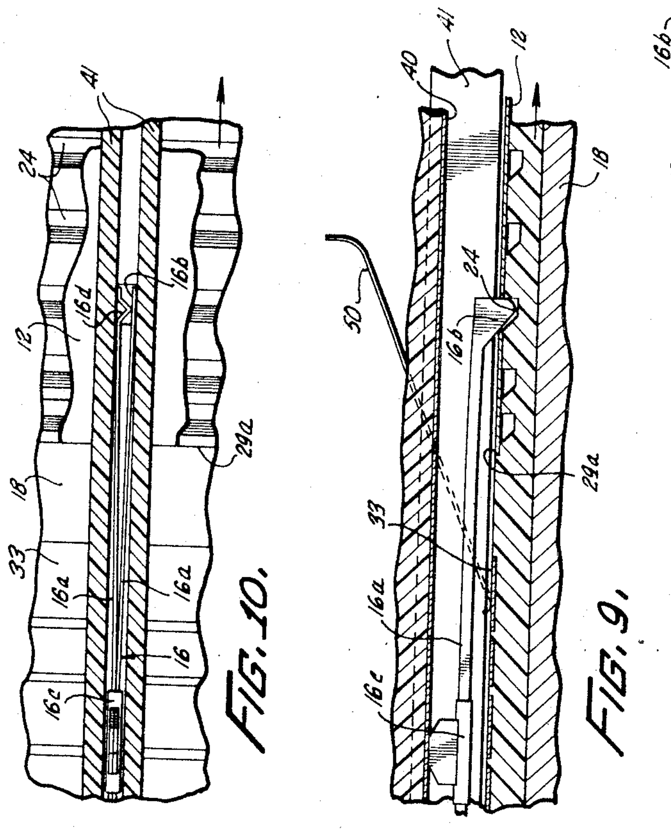
FIGURE 9 is a partial sectional view taken along the line 9—9 of FIG. 8.
FIGURE 10 is a partial sectional view taken along the line 10—10 of FIG. 8.
Figure 11:
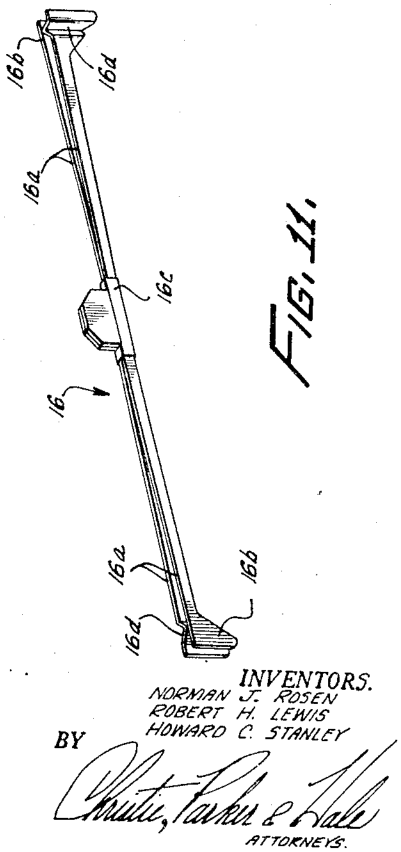
FIGURE 11 is a detached perspective view of the sensing elements for the reader of FIG. 1.

The sensing elements 16 are illustrated in FIG. 11 detached from the reader 10 and will now be examined in more detail. Each of the sensing elements 16 are of an identical construction and comprise a pair of flat, thin elongated, electrical conducting elements 16$^a$, such as may be constructed from a beryllium copper punching. The outer ends of the elements 16$^a$ are each provided with a sensing portion of finger 16$^b$. The sensing fingers 16$^b$ are defined relative to the size of the perforations of the record member 12 to not only engage the perforations but to pass therethrough; see FIGS. 8 and 9. The elements 16$^a$ are preferably constructed of a material that is of sufficient resiliency to allow a sensing finger 16$^b$ to electrically engage one of the row conductor bars 32 while under tension, and yet have sufficient stiffness to cause the sensing element 16 to be slidable when a sensing finger 16$^b$ engages a recorded perforation.

The pair of elements 16$^a$ are secured together by means of a saddle 16$^c$, which may be of one piece construction and may also be defined with a pair of sensing fingers extending in the opposite direction from the sensing fingers 16$^b$. The saddle 16$^c$ is arranged to loosely constrain the center of the elements 16$^a$ whereby the sensing fingers 16$^b$ for each element may be readily spaced apart a predetermined distance. The spacing is provided in this instance by producing a spacing channel 16$^d$ on one of the sensing fingers 16$^b$ and which channels have a depth defining the desired spacing between the sensing fingers. The distance between the adjacent sensing fingers 16$^b$ is defined to be related to the width of the recording channel or column on the record member 12 whereby each sensing finger is capable of separately engaging a perforation in the recording member 12 and separately providing the electrical current therethrough for indicating the presence of the perforation. This spacing is on the order of .040 inch when the standard IBM column width of approximately .056 inch is utilized.

It should be noted that the above-described dual construction of each sensing finger 16$^b$ not only provides dual contacts with each perforation on the record member 12 but also provides dual contacts at the row conductor bars 32. This sensing construction results in the contact between a record member and the sensing element to be always purely mechanical, since the electrical conducting sensing fingers are spaced from the perforation sensing fingers. Accordingly, the electrical contacts cannot be contaminated with foreign substances introduced into the reader 10 by means of the record members. The saddle arrangement of securing the sensing element 16$^a$ together also allows the entire sensing element to move to the required reading position even when only one of the perforation sensing fingers 16$^b$ engage a perforation. This construction, therefore, results in an inexpensive trouble-free operating, and easily maintained sensing element.

The function of the sensing element 16 is to provide the electrical connection between a row conductor bar 32 and a column bus 40 corresponding to the row and column in which a perforation is recorded on the record member 12. The length of the sensing element 16 is thereby defined whereby one pair of sensing fingers 16$^b$ engages a row groove 24 on the tray 18 while at the same time the sensing fingers at the opposite end engage the corresponding row conductor bar 32; that is, the row groove 24 and the row conductor bar 32 are representative of the same row on the record member 12. The distance between the saddle 16$^c$ and the sensing elements 16 corresponds to the distance between the securing notch 47 on the supporting member 14 and the conducting bus 45; that is, when the tray 18 is fully retracted from the reader 10 the outer sensing fingers 16$^b$ engage the conducting bus 40 while the saddle 16$^c$ is releasably secured by the V-shaped groove 47.

The sensing elements 16 are arranged to be carried by the supporting member 14 and are slidably mounted between a pair of guides 41 whereby the saddle portion 16$^c$ electrically engages the column buses 40. The space between the supporting member 14 and the tray 18 is reduced to place the sensing assemblies under continuous tension whereby they assume a bowed relationship such as shown in FIG. 7. The aforementioned spacing is of a depth whereby a continuous contact pressure is maintained at all three points of each sensing element 16, even when the sensing fingers 16$^b$ engage a row groove 24 The sensing elements 16 have sufficient stiffness to allow them to slidably leave the V-shaped securing grooves 47 when any one of the perforation sensing fingers 16$^b$ engage a perforation in the record member 12 to cause them to slide between their guides 41 and in continuous electrical contact with the column buses 40 in response to the sliding movement of the tray 18.

With the above structure in mind, the operation of the reader 10 may now be described. Assuming the tray 18 is arranged in a non-read position, slightly withdrawn, it may be fully extended to the position shown in FIG. 1 to allow the record member 12 to be positioned thereon. The record member 12 is held between the card guide 27 and the barrier 30, with the "9" edge of the record member 12 pushed against the raised shoulder 29$^a$ of the tray 18. The top edge, "12" edge, of the record member 12 will now drop inside the raised front edge of the tray 18. With the record member 12 correctly positioned on the tray 18, it may be pushed into the reader 10 by means of a handle 29. The tray 18 is pushed into the reader 10 to assume a reading position whereby the pawl 56 engages and latches onto the cam 62, locking the tray 18 in a reading position. At this time the floating pin 52 is elevated and operates the switch 51. The operation of the switch 51 provides an electrical signal to the data processing system indicating that the tray 18 is in a position to be read. It should also be noted that the spring 61 is compressed by the tray 18 and is maintained in this compressed condition as a result of the latching of the tray 18 into the reading position.

During the travel of the tray 18 into the reader 10, each of the sensing elements 16 engage the record member 12 at the perforation sensing fingers whereby they successively sense each row beginning with row nine through row twelve. When any one sensing element 16 engages a perforation in the record member 12 the sensing element 16 that is so engaged has its perforation sensing finger extended through the record member 12 as shown in FIG. 9 to engage the corresponding groove 24. The interengagement of the perforation sensing fingers and a row groove 24, and the continued travel of the tray 18 function to release this sensing element 16 from the securing groove 47 whereby it is allowed to slide along its column bus 40 until the tray 18 is latched. When the tray 18 is latched in a reading position, the innermost, or row bar, sensing fingers will be arranged in electrical engagement with the corresponding row conductor bar 32 whereby an electrical circuit will be completed between the terminals 42 by means of the individual column bus 40, the sensing element 16, the row conductor bar 32, and the element 50 corresponding to the row terminal.

If, during the travel of the tray 18, the sensing element 16 for any one column does not engage a perforation in a record member 12, this sensing element will not be released from the groove 47 but will be retained in its initial non-read position whereby the outer sensing fingers will engage the blank column conducting bus 45, while the inner sensing fingers will be in electrical contact with the row conducting bar 33. At this time an electrical circuit path is provided between the conducting bus 45, the row conducting bar 33, and to a corresponding element 50 to indicate the sensed column is blank, and has no perforations recorded therein. If more than one blank column is detected on the card, only a single indication that a blank column is present will be provided by this arrangement.

After the tray 18 is positioned for reading and the reading signal is indicated by the operation of the switch 51, the data processing system may interrogate the reader 10. The data processing system may then interrogate the reader 10, row by row, to digitally interpret the signals provided by the connections between the row and column buses. Upon completion of its interrogation, the data processor will provide a pulse to the rotary solenoid 55 to cause the floating pin 52 to release the pawl 56. When the pawl 56 is released the compression spring 61 automatically ejects the tray to a partially open position. The operator may then expose the tray to its fully extended position and remove the record member 12 in preparation for the next reading operation. It should be noted that in lieu of the pulsing of the solenoid 55 to release the tray 18, the reader 10 is provided with a removable button 62 on the housing 12 to allow access to the pawl 56 to manually release it and thereby eject the tray 18.

Assuming that on the next reading operation, no record member 12 is on the tray or a record member is utilized thereon of narrow columnar capacity than the tray, in this instance, less than the required number of twelve columns, then, under either of these latter conditions, the tray 18 will still assume its correct reading position, but each of the sensing elements 16 which do not engage a record member will immediately engage the groove 26 and the corresponding sensing fingers will engage the insulative area of the tray beyond the "9" row conductor bar 32. Since these sensing elements 16, at this time, are connected to insulating portions, no electrical signal will be provided to the data processing system and the lack of an electrical signal will indicate that no card or a short card is in the reader 10.

Figure 12:
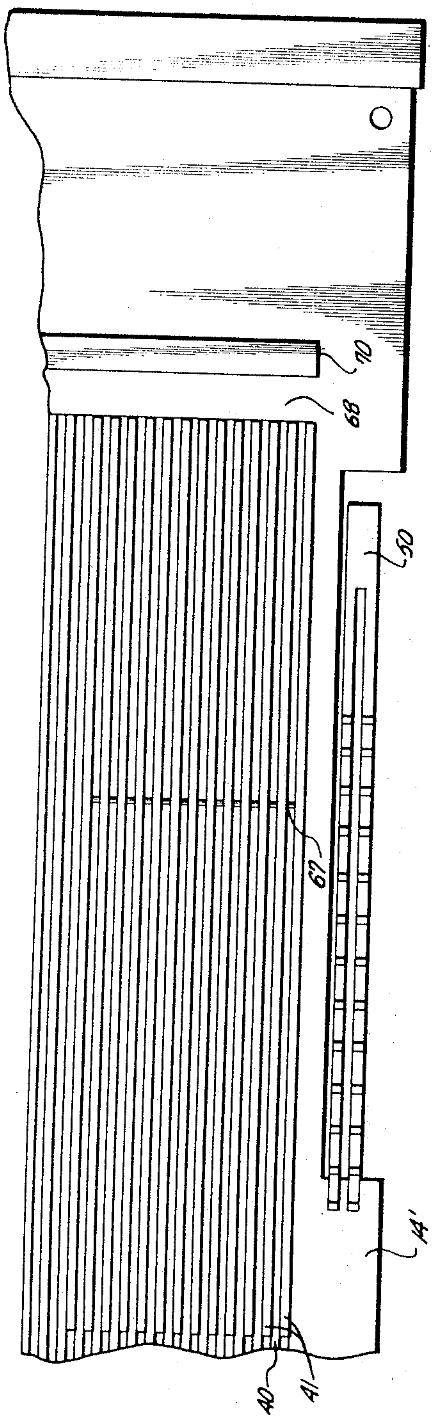
FIGURE 12 is a partial bottom plan view of a supporting member having a modified structure for the non-read position.

Now referring to FIGS. 12 and 13, a modified structure for the non-read position or blank column detection for the reader 10 will be described. The general structure of the reader 10 is identical to the above-described structure and operation and the modifications merely relate to the construction of the sensing element 16 and the cooperating structure of the supporting member 14' and the tray 18 to releasably retain the sensing elements in the non-read position.

The modified sensing element 16 includes a lifting camming surface 16$^e$ defined intermediate the sensing finger 16$^b$ and the saddle 16$^c$ shown arranged adjacent each of the fingers 16$^b$ and spaced inwardly therefrom towards the saddle member 16$^c$. The saddle member 16$^c$ is modified merely to eliminate the chamfer whereby the top surface of the pair of sensing fingers presents a substantially planar surface to the column buses 40, as shown. The camming surface 16$^e$ is defined for cooperation with an electrical conducting lifting wire 67 carried by the guides 41 whereby the interengagement of the lifting wire 67 and the camming surface 16$^e$ causes the adjacent sensing fingers 16$^b$ to be lifted upwardly and out of engagement with the tray 18 and, in particular, the row conductor bars 32. The provision of the camming surface 16$^e$ for each of the fingers 16$^b$ rather than for just the row bar sensing fingers is merely for manufacturing purposes rather than functional.

The supporting member 14' differs from the supporting member 14 in the elimination of the V-shaped groove 47 and the elimination of the blank column conductor bus 45. The column buses 40 are defined in the supporting member 14' in the same fashion as described hereinabove and their outer ends terminate adjacent an insulating strip 68 located in the same general area as occupied by the V-shaped groove 47. Opposite the terminal ends of the column buses 40 and arranged on the opposite side of the insulating strip 68 there is provided a common blank column bus 70 running transversely of the supporting member 14'. The location of the saddle 16$^c$ for the sensing elements 16 and the strip 68 are dimensioned relative to one another whereby the sensing fingers of the saddle 16$^c$ do not engage the outer ends of the column buses 40 but do engage the blank column bus 70 when the tray 18 is in a non-read position. It should be recognized that the extension of the column buses 40 is not shown in FIG. 12 and could have been eliminated in the previous embodiment as well since they serve no useful function.

The conductive lifting wire 67 is mounted in the guides 41 by means of a transverse aperture running through each of the guides and spaced inwardly from the insulating strip 68 a preselected distance to allow the wires to cooperate with the camming surface 16$^e$ to effect the desired lifting action. In order to obtain the desired electrical indication of the non-read position or blank column detection for the reader, the blank column bus 70 is electrically connected to a separate bifurcated element 50 (not shown) to define a complete electrical circuit with the stationary lifting wire 67. The circuit extends from the lifting wire 67, the forced contact between the wire 67 and the sensing elements 16 and the blank column bus 70 to the connected bifurcated element 50.

The receiving tray 18, when it is provided with a blank column conducting bar 33, will also be modified for the present non-read structure by the elimination of the blank column conducting bar 33. As indicated hereinabove, the function of this column conducting bar 33 is served by the lifting wire 67.

Figure 13:
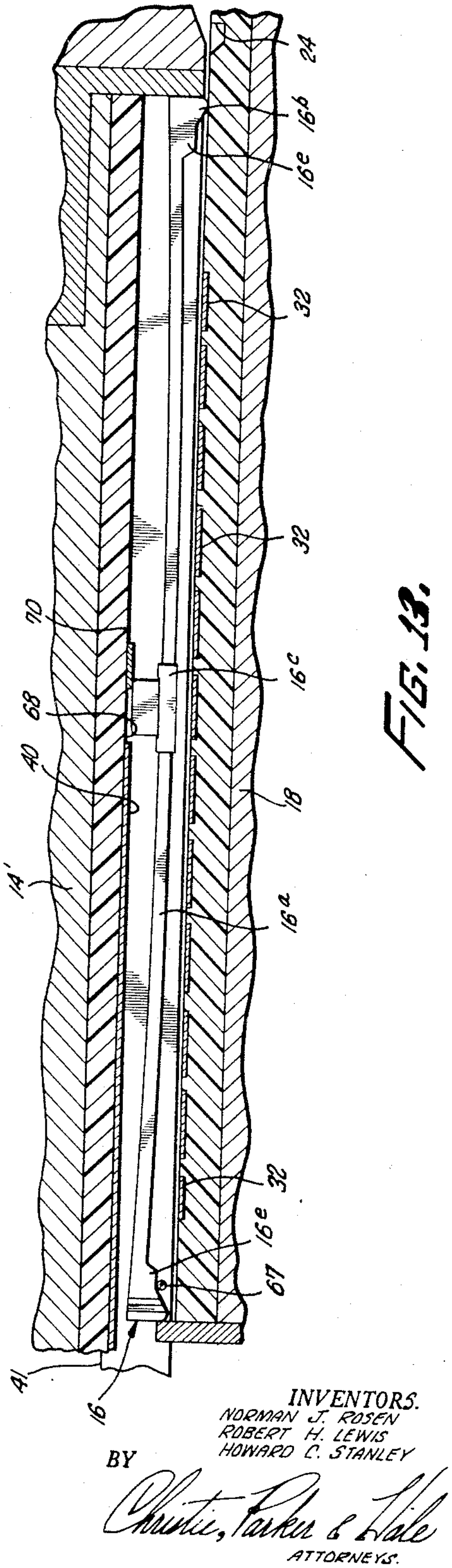
FIGURE 13 is a partial longitudinal, cross-sectional view of the receiving tray and the supporting member of FIG. 12 showing a modified sensing element secured in the non-read position.
Figure 1A:
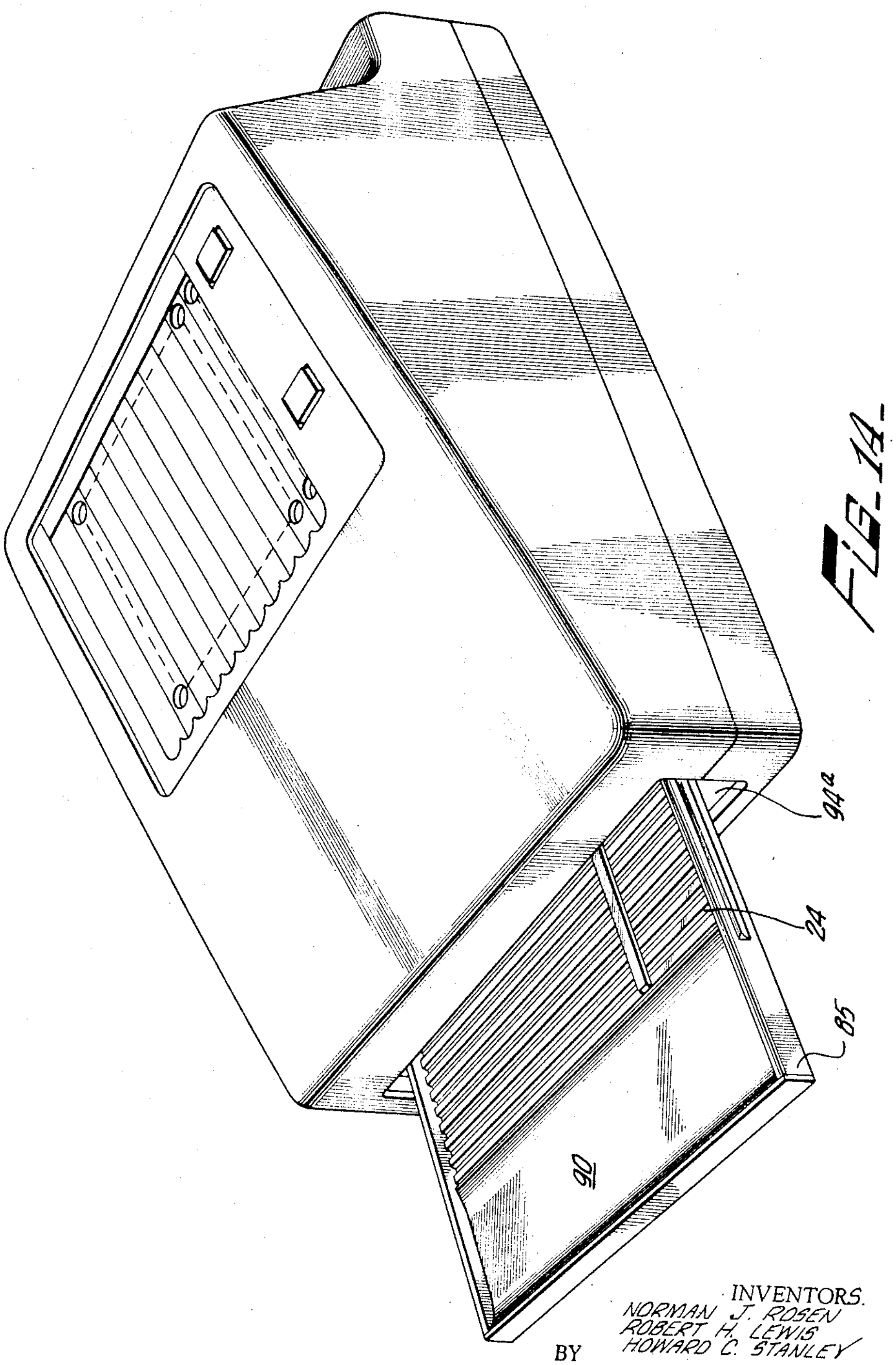
Figure 15:
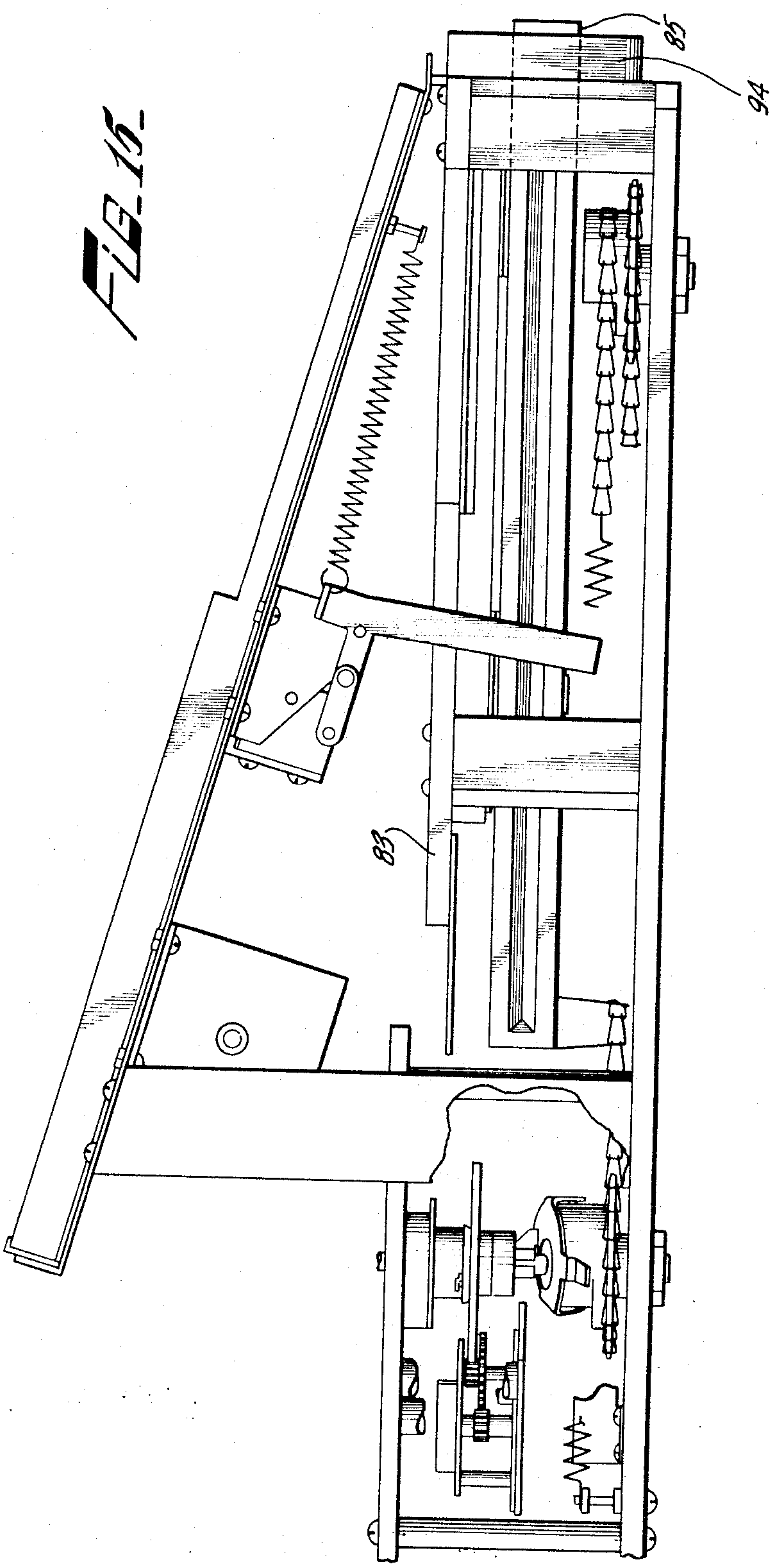
FIGURE 15 is a side elevational view of the input station of FIG. 14 with the housing removed.
Figure 16:
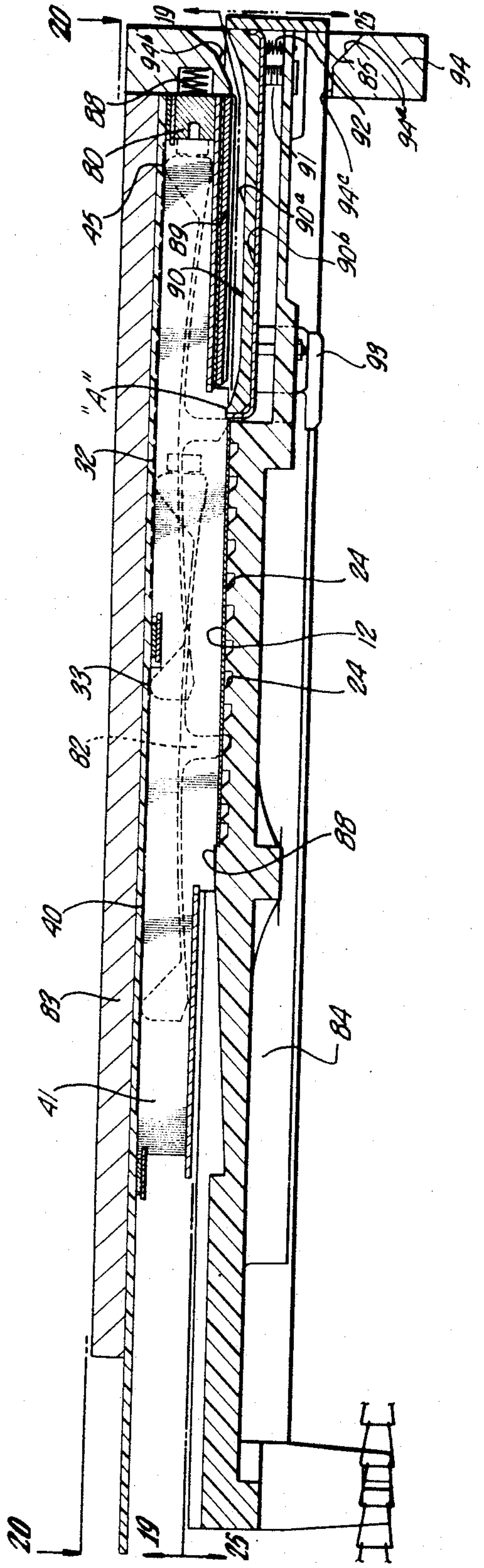
FIGURE 16 is a partial longitudinal, cross-sectional view of the record reader portion of the input station of FIG. 14 showing the record card receiving tray in a reading position.

The non-read position of the modified sensing element 16 is shown in FIG. 13 wherein the inner or row bus sensing finger 16$^b$ is held out of physical contact with the top surface of the receiving tray 18 by means of the interengagement of cam surface 16$^e$ and the lifting wire 67. This arrangement will then provide the electrical indication that the reader 10 is in the non-read position. When the receiving tray 18 is slidably moved into the reader 10 to effect a reading operation, the outer or the perforation sensing fingers 16$^b$ upon engagement with a perforation in the record member 12 will force the sensing element 16 to move inwardly and to disengage the camming surface 16$^e$ from the lifting wire 67 to allow the sensing fingers 16$^b$ to drop into engagement with the top surface of the receiving tray 18 whereby it may be positioned on the correct row conductor bar 32. At this same time the saddle 16$^c$ will travel away from the insulating strip 68 and engage the corresponding column bus 40. The continual travel of the sensing element 16, after disengagement with the lifting wire 67, will not provide an electrical contact between the sensing element 16 and the wire 67 since the vertical position of the wire 67 is defined to maintain a spaced relationship with the sensing element 16 except at the camming surface 16$^e$.

When the sensing element 16 senses the absence of a card or a card having a columnar capacity less than the columnar capacity of the tray 18, the perforation sensing fingers 16$^b$ engage the groove 26 as described hereinabove.

It should be noted that the above-described modified non-read structure provides an increased force on the perforation sensing fingers 16$^b$ relative to the force produced when the V-shaped groove 67 is utilized. This slight increase in force is desirable and is to be contrasted with an undesirable reduction in sensing finger force occurring as a result of the coaction of the saddle 16$^c$ and the V-shaped groove 47. The modified structure has been found to reduce the manufacturing costs and to extend the life of the record reader 10 by eliminating the wear concentration of the V-groove 47. The V-groove arrangement is satisfactory for most reader applications.

Now referring to FIGS. 14–27, a device for sensing and transmitting information to a receiving apparatus employing a modified record reader will be examined. The device illustrated in FIG. 14 is commonly referred to as an input station for a data acquisition system and includes both the record reader and the means for transmitting the information read from a record member to a remote receiving station. Only the record reader portion of the input station will now be described and a more comprehensive understanding of the entire input station may be had by reference to the co-pending application entitled, Input Station, filed on Mar. 28, 1963 and bearing Ser. No. 268,650 and assigned to the same assignee as the present application.

The general organization of the modified record reader for the input station is the same as described hereinabove, only the structural organization thereof is improved. To this end, a record member to be read is positioned on a movable tray and presented to a plurality of sensing elements for sensing each of the columns on the record member, the sensing elements being normally arranged in a non-read position and moved from this position to a perforation indicating position in response to the movement of the tray. As in the previous embodiment, the tray is adapted to read either a single record member or a plurality of record members simultaneously.

In the embodiment of the record reader as employed in the input station the structural organization is changed whereby the row conductor bars 32 are arranged in the same plane as the column buses 40 rather than on the record card receiving tray 18. To this end, it will be recalled that the column buses 40 were advantageously constructed in terms of a printed circuit board and in this modified embodiment a single printed circuit board is utilized for both the row and column conductor buses. This printed circuit board is mounted to the supporting structure 83 and in turn is mounted on the base member 84, as in the previous embodiment. The supporting structure 83 further includes a magnetic detent assembly comprising a permanent magnet 80 for releasably retaining each of the sensing elements 82 in a non-read position. The sensing elements 82 for use in the modified record reader are also modified in accordance with this improved structure for reading a record member presented thereto by means of the slidable tray 85.

Figure 18:
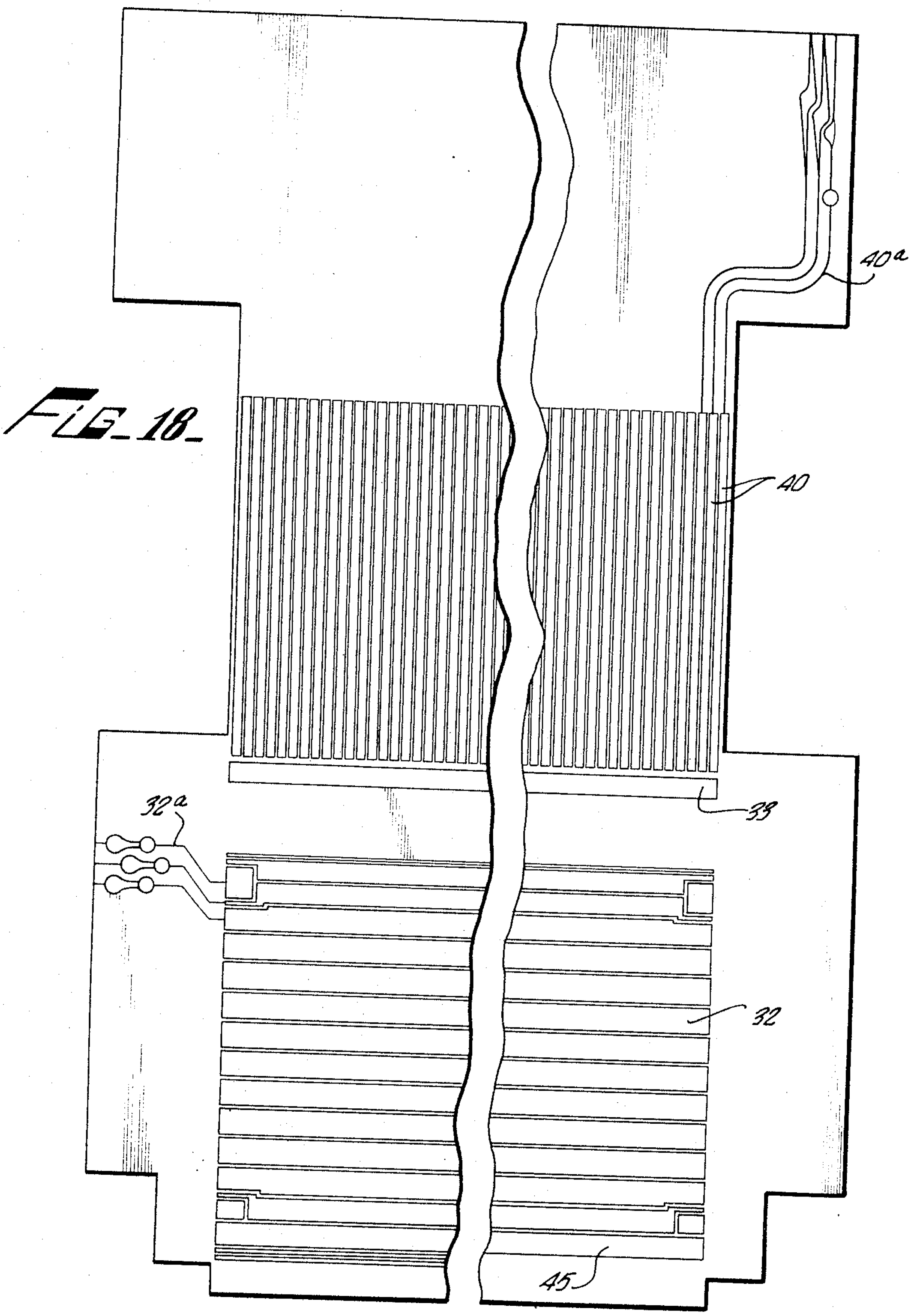
FIGURE 18 is a plan view of a detached printed circuit board having the row and column buses defined thereon for use in the record reader.
Figure 19:
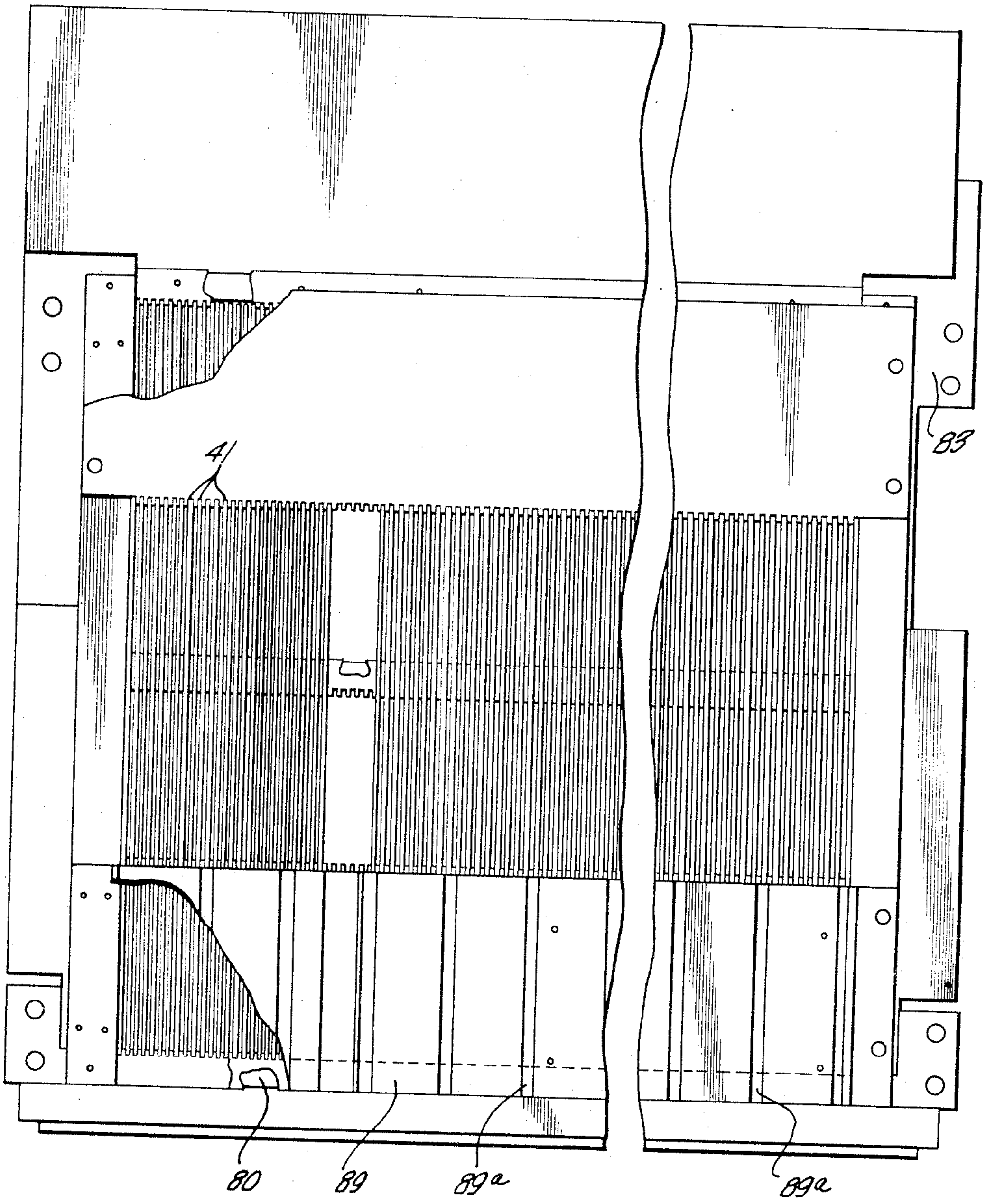
FIGURE 19 is a bottom plan view of the supporting structure taken along the line 19—19 of FIG. 16.
Figure 20:
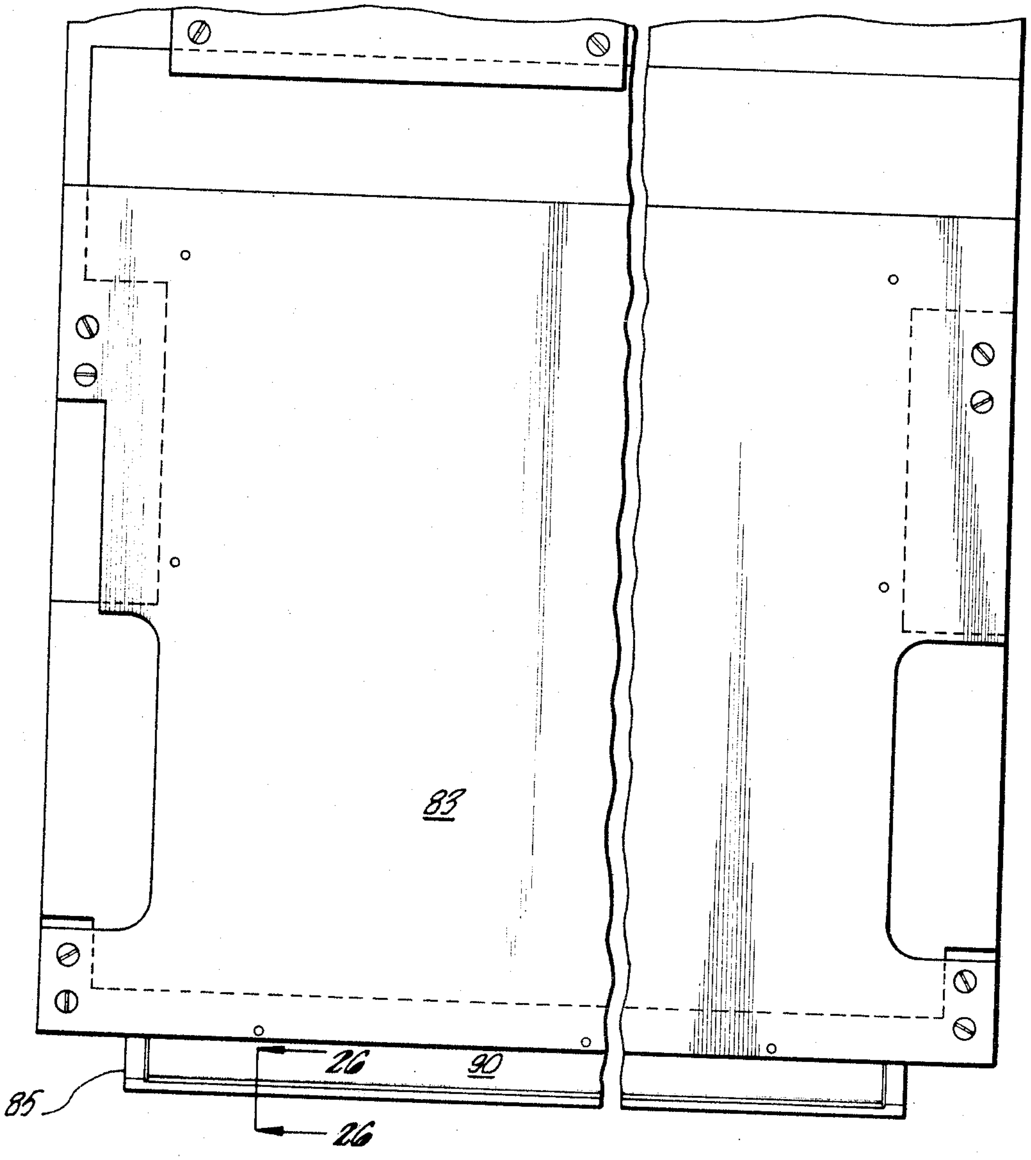
FIGURE 20 is a top plan view of the structure of FIG. 19 taken along the line 20—20 of FIG. 16.
Figure 26:
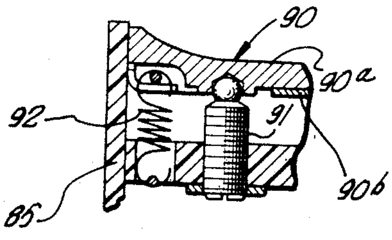
FIGURE 26 is a partial cross-sectional view of the record card receiving tray taken along the line 26—26 of FIG. 20.

The supporting structure 83 mounts the single printed circuit board carrying the row and column buses, as best seen in FIG. 18. The number of column buses 40 preferably correspond to the width of the tray 85 or the total columnar capacity of the tray. As in the previous embodiment, each of the column buses 40 are provided with a pair of longitudinally extending, insulative guides 41 arranged on opposite sides to the column buses 40. A blank column bus 33 is also provided alongside the column buses 40 and is arranged in a spaced relationship therefrom. The blank column bus 33 is arranged to run transversely of the column buses 40 and is spaced forward thereof, in the direction of the row buses 32, see FIG. 18. The blank column or "no data" indication is further dependent on the row bar 33 arranged forward of the row bars 32 whereby a sensing element 82 cross-connects the buses 33 and 45 in the non-read position and when a blank column is detected.

It should be also noted that it is not only advantageous from a manufacturing standpoint to construct the row and column buses on one printed circuit board but it also eliminates the brushes 50 (see FIGS. 3, 4, and 9) required in the previous embodiments for electrically connecting the row buses 32 to the outgoing lead wires. These outgoing lead wires may now be directly connected to the printed circuit leads 40$^a$ and 32$^a$, for example. In addition, the organization of the printed circuit is such that the row and column buses face downward and thus the collection of dirt and foreign matter will not affect the contact making capability of the record reader.

The sensing elements 82 are maintained in the "no data" position through the inclusion of a magnetic detent in the form of a channel permanent magnet 80. The magnet 80 is carried by the supporting structure 83 forward of the "no data" row bar 45. The channel magnet 80 is a commercially available item and is proportioned to have a magnetic structure to retain each of the sensing elements 82 in their non-read position and to release them when their sensing finger engages a recorded perforation in the record member under the urging of the travel of the record member receiving tray into reading position. A compression spring 88 is carried by the supporting structure 83 and is mounted behind the permanent magnet 80 to cushion the shock of all the sensing elements 82 forcibly returning to the magnet 80 when the tray 85 is fully retracted.

Figure 22:
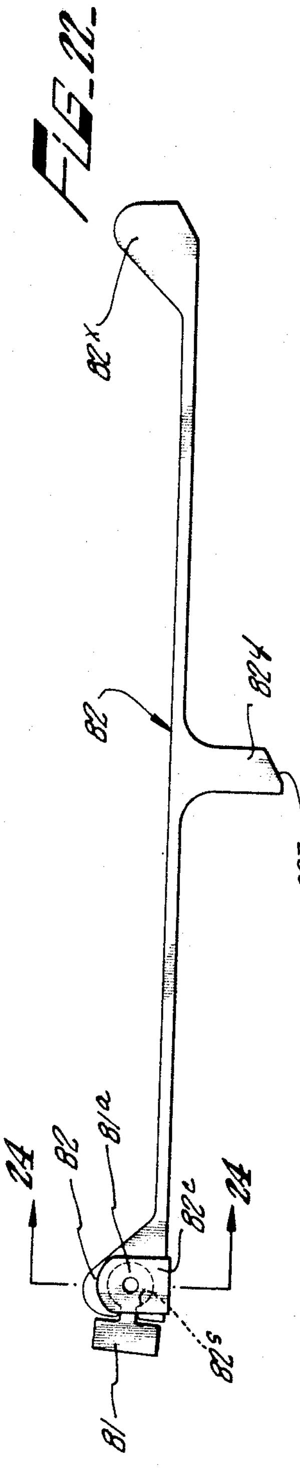
FIGURE 22 is a side elevational view of a modified sensing element for use in the record reader of FIGS. 16 and 17.
Figure 23:
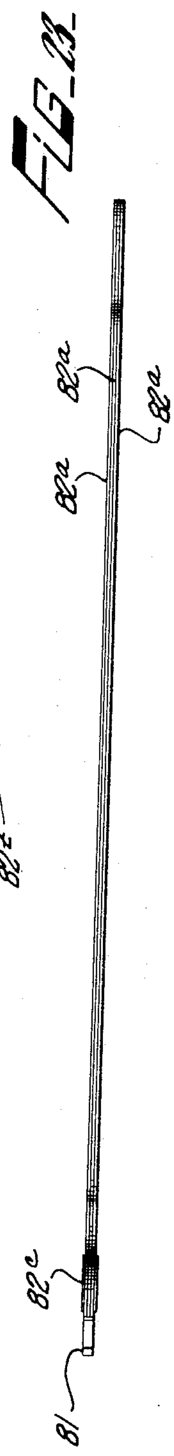
FIGURE 23 is a top view of the sensing element of FIG. 22.
Figure 21:
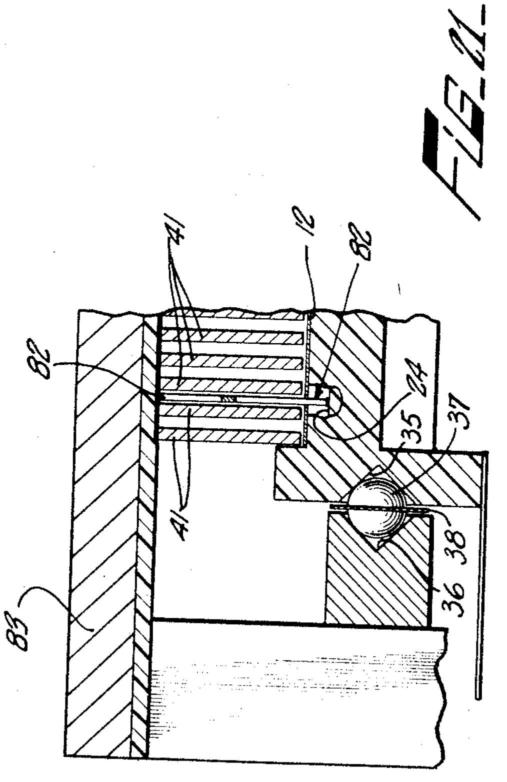
FIGURE 21 is a partial cross-sectional view of the supporting structure for the sensing elements for the record reader of FIGS. 16 and 17.
Figure 24:
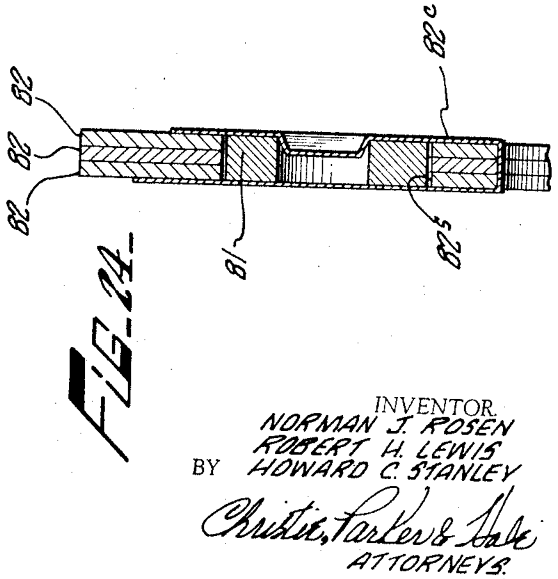
FIGURE 24 is a cross-sectional view of the securing means for the sensing element of FIGS. 22 and 23 taken along the line 24—24 of FIG. 22.
Figure 25:
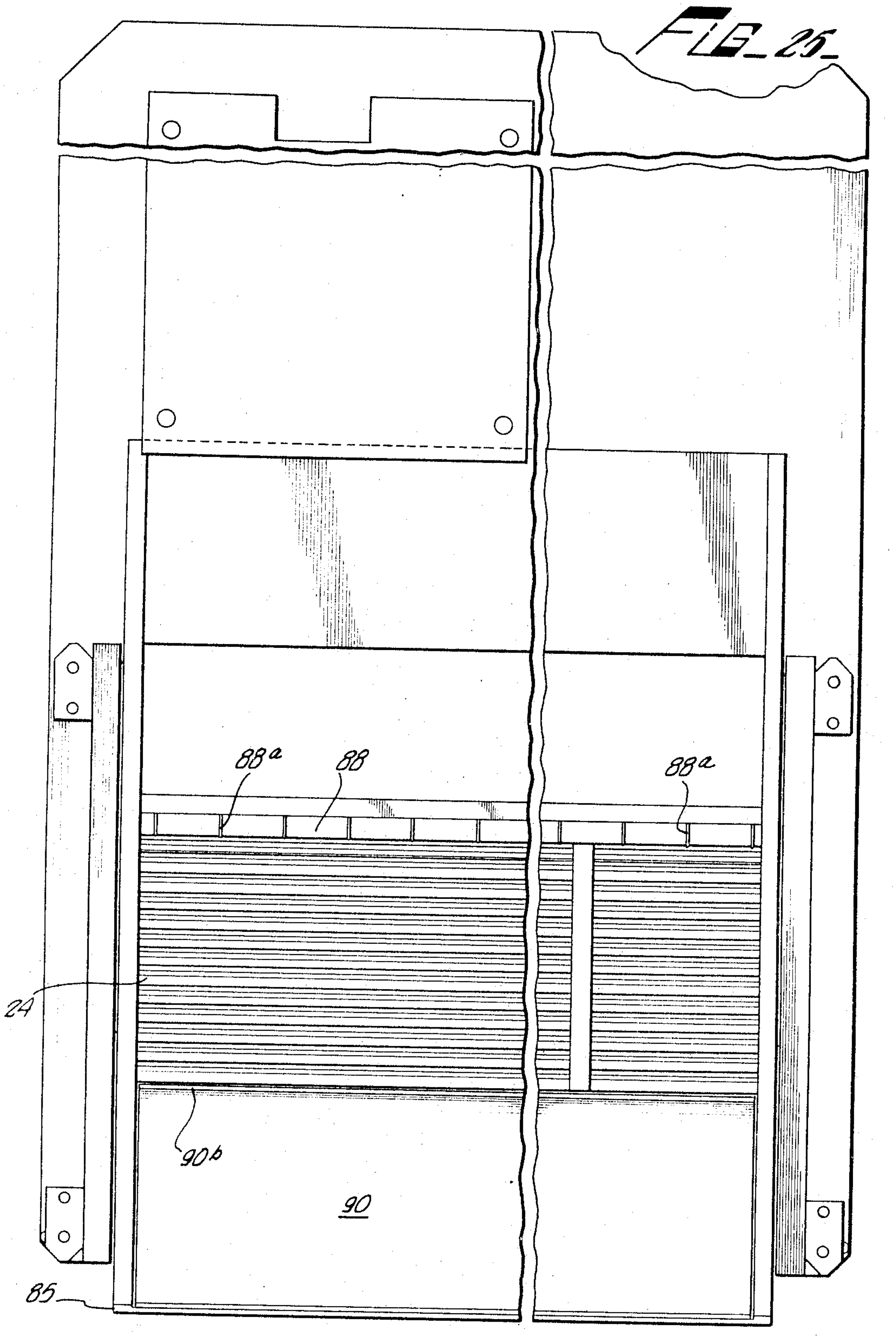
FIGURE 25 is a top plan view showing the record card receiving tray taken along the line 25—25 of FIG. 16.

Now referring to FIGS. 22 through 24 in particular, a detailed examination of the modified sensing element 82 will better disclose the additional features of this modified sensing element. It should be noted that the sensing elements 82 are stamped out of the same material as the above-described embodiments and comprise a plurality of flat, thin, elongated, electrical conducting fingers 82$^a$ such as may be constructed from a beryllium copper. Specifically, the use of beryllium copper allows the sensing fingers to have sufficient resiliency to allow the sensing element to engage one of the row conductor bars and column buses while under tension and yet have sufficient stiffness to allow the sensing fingers 82 to be independently slidable when a sensing finger engages a recorded perforation. In this particular embodiment the redundant characteristic of a sensing element is provided through the use of three identical sensing fingers 82$^a$ that are loosely constrained together by means of a saddle 82$^c$ constructed of the same material as the sensing finger proper. Each sensing finger 82$^a$ is defined with a pair of electrical sensing portions arranged adjacent each end and are identified as 82$^x$. Each electrical sensing portion 82$^x$ extends outwardly from the body proper of the sensing finger in the same direction while a perforation sensing portion 82$^y$, which is substantially centrally arranged between the electrical sensing portions 82$^x$, extends outwardly from the sensing finger proper in the opposite direction. The perforation sensing portion 82$^y$ is generally defined in the same fashion as in the previous embodiments and includes a tapered portion 82$^z$ defined to allow the sensing portion 82$^y$ to be readily released from a sensed perforation upon completion of the reading operation.

One of the electrical sensing portions 82$^x$ is defined with a socket portion 82$^s$ to receive a ball 81$^a$ defined integrally with an armature 81. As will be evident from examining FIG. 22, it will be seen that the armature 81 is arranged with its ball portion 81$^a$ fitted into the socket 82$^s$ of the sensing portion 82$^x$ and that each of the sensing fingers 82$^a$ are secured together at this sensing portion by means of the saddle 82$^c$. The saddle 82$^c$ is secured together by means of a dimple portion extending through the socket of the sensing portion 82$^x$ as well as a central opening 81$^b$ defined for the armature ball 81$^a$. It will be recognized that the use of the permanent magnet 80 for securing the sensing element 82 in a non-read position requires that the armature 81 be constructed of a magnetic material. Furthermore, the armature 81 is defined with a magnetic surface to cooperate with the pole faces of the permanent magnet 80 to positively secure the armature 81 thereto and retain each of the sensing elements 82 in this position during the searching operation and to release the sensing element 82 when the sensing portion 82$^y$ locates a recorded perforation. The magnetic pull or strength of the magnet 80 is proportioned to allow the force applied to the sensing elements 82 by means of the motion of the tray 18 to overcome the magnetic pull on the armature 81 whereby it is released to travel with the record card receiving tray 18 to provide the correct cross-connection between the column buses 40 and the row conductor bars 32. It will be recognized that the arrangement of the record reader shown in FIG. 17 with the receiving tray 85 open is such that the sensing elements 82 are positioned in the non-read position.

It should now be evident that the function of the modified sensing elements 82 is the same as in the above-described embodiments and operates under the same general conditions. However, in the present embodiment the searching force is doubled due to the location of the perforation sensing portions 82$^y$ intermediate the electrical sensing portions 82$^x$ and to which latter portions a force is applied to the sensing fingers for placing them under tension. In addition, the construction of the saddle 82$^c$ is such as to allow freedom of the individual sensing fingers to provide independent, parallel electrical contacts yet allowing the entire sensing element 82 to be driven by only one sensing finger that is located in a card perforation without providing for additional spacing as in the previous embodiments. This permits effective card reading even though the card perforations are not perfectly aligned with the sensing elements 82.

The record member receiving tray 85 for this embodiment not only is modified through the removal of the row conductor bars 32 therefrom but further includes means for readily inserting and orienting a record member on the tray. For this purpose the slidable tray 85 may be considered to comprise a reading station and a record member insertion station. The record member reading station is arranged inwardly of the insertion station whereby the card is slipped over the insertion station onto the reading station. To this end, the reading station is defined in the same general fashion as in the previous embodiment with the reading station constructed of an insulative material having a plurality of spaced grooves 24 corresponding to the number of rows on the record member or members to be read. The spaced grooves are adapted to receive the perforation sensing portion 82$^y$ of the sensing elements 82.

The reading station further includes a unique means for positioning a record member just prior to and during the engagement of the perforation sensing portions of the sensing elements whereby even curled and crumped record members may be read. To this end, adjacent the inner row groove 24 there is defined a low shoulder 88 extending the entire width of the tray 85 to receive the leading edge of a record member. To prevent the leading edges of a record member from slipping over the shoulder 88 it is further provided with a plurality of toothlike upward extensions 88$^a$ defined thereon, see FIG. 25. As illustrated, one extension 88$^a$ is utilized for each ten sensing elements. A stationary, flat spacer plate 89 mounted on the supporting structure 83 immediately above the toothlike extensions 88$^a$ and adjacent to the record member contains recessed grooves 89$^a$ which match the extensions 88$^a$ whereby upon movement of the tray 85 the extensions 88$^a$ are guided through the grooves 89$^a$ to thereby completely and positively restrain a record member during its travel into a reading position.

The extensions 88$^a$ are arranged to coincide with each tenth sensing element guide 41 in the sensing element and are encountered by the tray 85 as it travels inwardly. In this fashion, then, the perforation sensing portions of the sensing elements are not obstructed by this stop. It should also be noted that each tenth guide is aligned with one of the extensions 88$^a$ and, therefore, is defined more narrowly than the adjacent guides, enabling the narrower guides to avoid the extension 88$^a$ as the tray 85 is pushed in. The combination of the wide and relatively few guides 41 in combination with the extensions 88$^a$ further provides a positive holding means as a record member moves into or out of the reading position.

Figure 17:
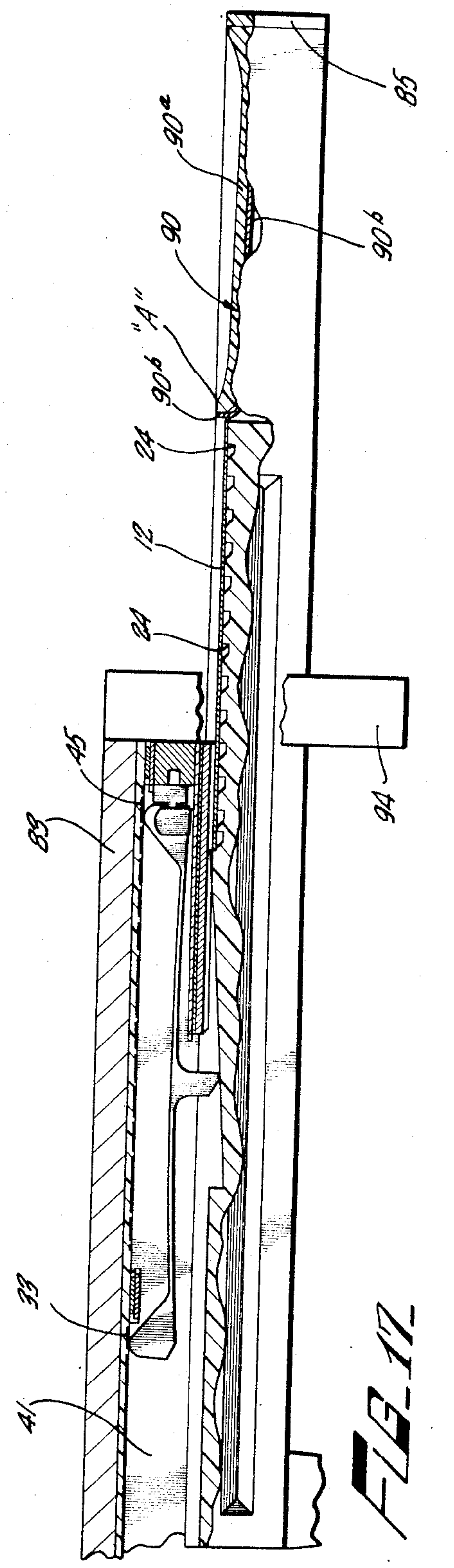
FIGURE 17 is a partial elevational, cross-sectional view of the record reader shown in FIG. 16 with the receiving tray in its extended, non-read position.

Now considering the record number insertion station of the tray 85, it will be seen to comprise an index plate 90 for allowing a record member to be simply and rapidly introduced into the reading station. The plate 90 is conveniently curved to allow easy record member insertion and positive location along its entire width and record member withdrawal through the spring-lifted hinge action provided for the plate 90. The plate 90 is constructed of a plastic material 90$^a$ with a metallic reinforcing element 90$^b$ as a backing member. The index plate 90 is hinged at its outer end to the tray 85 by means of a ball and socket system 91 which further allows universal adjustment, as can be best seen in the detail of FIG. 26. The index plate 90 is urged upwardly by yieldable means shown as the compression spring 92. The compression spring 92 constantly urges the index plate 90 upwardly whereby the inner end thereof extends a preselected amount above the level of the reading station. This extended inner end of the index plate 90 is identified by the reference letter A, and is defined of sufficient height to allow an ample pushing shoulder to be defined by the metallic end 90$^b$ of the index plate 90 for retaining the record member at the reading station when the tray is in its extended or open position, as best seen in FIG. 17. The extension of the end A of index plate 90 above the surface of the reading station is governed by a stop means or shoe 93 positioned underneath the index plate 90 and depending therefrom. The upward travel of the shoe 93 abuts the insulating supporting structure defining the reading station and which structure extends longitudinally below the index plate, as seen from examining FIG. 16.

A further aspect of the record member insertion station includes the construction of the housing for defining a throat through which the movable tray 85 is pushed into and out of reading position. To this end, the throat is defined in the housing by means of a collar 94 having a central opening 94$^a$ extending transversely of the record reader to accommodate the receiving tray 85. The upper surface 94$^b$ of the collar 94 is defined as a camming surface for acting on the upwardly extending tip A of the index plate 90 and push it down to allow it to pass below the spacer 89. The other surface of the collar 94, or lower surface 94$^c$, is defined as a stop to limit the downward travel of the index plate 90. To this end, the lower surface of the shoe 93 engages the surface 94$^c$ of the collar 94 to limit its downward travel. When the tray 85 is violently closed the shoe 93 impinges upon the surface 94$^c$ just as the tray is pushed into the record reader whereby the index plate 90 temporarily drops below the desired level or below the level of the reading station and is arrested by the coaction of the surface 94$^c$ and the shoe 93. This feature prevents record members positioned on the tray when it is violently closed from inadvertently slipping ove rthe edge A of the index plate.

With the modified structure for the tray 85 in mind, it will be seen that a record member 12 may be easily inserted into the reading station by the operator depressing the index plate 90 with his thumb and pushing it into the reading station against the shoulder 88. In the same fashion the record member may be simply removed from the reading station after a reading operation is completed.

What is claimed is:

1. A reader for a record member arranged with a preselected number of rows and columns for recording information by means of perforations in a particular row and column, including, in combination, a record member receiving tray mounted for sliding movement into and out of a reading position, said tray being defined with a plurality of grooves corresponding to the number of rows on the record member to be read and with the grooves spaced apart a distance corresponding to the spacing of the rows on the record member and further defined with a plurality of spaced row conductor bars corresponding to the plurality of rows of the record member and insulatively spaced apart a distance corresponding to the spacing between the grooves, a plurality of electrically conductive sensing elements for detecting a perforation on the record member and the corresponding row conductor bars, said sensing elements comprising a substantially central sensing finger and a pair of spaced sensing fingers arranged on opposite sides of said central sensing finger and spaced apart a distance corresponding to the distance between a row groove and the corresponding row conductor bar, each sensing finger of the pair of sensing fingers being spaced apart a preselected distance related to the width of a column on the record member, a supporting member mounted in a spaced relationship with said tray and releasably holding each of said sensing elements in a forced relationship and yet allowing the sensing elements to slide upon the production of relative movement between the supporting member and the tray, the supporting member being further characterized as having a plurality of column conductors insulatively spaced apart a distance corresponding to the distance between the columns of the record member and including means for releasably securing the sensing elements in a non-read position and a blank column bus arranged thereon at an outer extremity, the sensing elements being held and secured in the non-read position with a sensing finger engaging the blank column bus, the relative movement of the tray and the supporting member causing a record member to be read to be presented to the sensing elements to sequentially sense each row thereof whereby when a sensing element engages a recorded perforation and thereby engages the corresponding row groove of said tray, a sliding movement of the sensing element causes a disengagement from the non-read position and the travel of the pair of sensing fingers at the opposite end to electrically engage the corresponding row bus when the tray is in a read position while a sensing element presented with a blank column remains in the non-read position.

2. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended from the housing at least a distance to allow a record card to be positioned on the exposed portion of the tray, said tray being constructed of an electrically insulative material defined with a plurality of grooves on the exposed portion thereof corresponding to the number of rows on the record member to be read with an additional groove for detecting the absence of a record card in the tray and spaced apart a distance substantially equivalent to the spacing of the rows on the record member and further defined with a plurality of spaced row conductor bars corresponding to the plurality of rows arranged on the record member to be read with an additional row conductor bar for detecting the absence of a perforation in a column and insulatively spaced apart a distance corresponding to the distance of the grooves, the additional groove being arranged adjacent to and spaced from the innermost groove on the tray, the additional row bus being arranged adjacent to and spaced from the outermost row bus, a supporting member mounted in the housing and spaced from the tray, said supporting member being defined with a plurality of guides corresponding to the number of columns of the record card to be read extending transversely to the row conductors and spaced apart a distance corresponding to the distance between the columns of the record card to be read and having an electrically isolated conductive portion substantially coextensive with each of the guides, at least a single electrically conductive sensing element including a sensing finger spaced on opposite sides of a substantially central portion arranged in forced electrical contact with the conductive portion of one of said column guides and adapted to be guided by said column guides and to slide along said conductive portions, the supporting member being further defined to releasably secure the sensing element in a non-read position corresponding to the fully extended position of the tray whereby the innermost sensing fingers assume a position in electrical engagement with said additional row bus, when the tray is slidably moved into reading position a sensing finger can engage a perforation on a record card to be read and thereby engage the corresponding row groove and in response to the continuous sliding movement of the tray into the housing releases itself from the non-read position and slides along its column groove to cause the sensing finger at the opposite end to engage a row bus representative of the row having the sensed perforation upon reaching the read position of the tray within the housing and correspondingly a sensing finger can engage said additional groove with the sensing finger at the opposite end thereof arranged to engage an insulative portion upon reaching the read position of the tray within the housing.

3. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended outwardly from the housing a distance corresponding to the width of a record card having a predetermined number of rows thereon and to be positioned on the exposed portion of the tray, said tray being constructed of an electrically insulative material defined with a plurality of grooves on the exposed portion thereof corresponding to the number of rows on the record member to be read and having the grooves spaced apart a distance substantially equivalent to the spacing of the rows on the record member and further defined with a plurality of spaced row conductor bars corresponding to the plurality of rows on the record member to be read plus an additional row conductor bar for detecting the absence of a perforation in a column and insulatively spaced apart a distance corresponding to the distance between the grooves, the additional row being arranged adjacent to and spaced from the outermost row bus, a supporting member mounted in the housing and spaced from the tray, said supporting member being defined with a plurality of guides corresponding to a preselected number of columns of the record card to be read extending transversely to the row conductors and spaced apart a distance corresponding to the distance between the columns of the record card and each having an electrically isolated conductive portion substantially coextensive with the guides, a plurality of electrically conductive sensing elements removably mounted in said guides for each column to be sensed, said sensing elements comprising a substantially centrally located column bus sensing finger and a pair of spaced sensing fingers arranged at opposite ends from said central sensing finger and spaced apart a distance corresponding to the distance between a row groove and the corresponding row bus, each of said sensing elements being arranged in forced electrical contact with the conductive portion of one of said column guides by means of said central sensing finger and slidable along the top surface of said tray under the guidance of said column guides, the supporting member being further defined with a blank column bus arranged thereon at an outer extremity and means for releasably securing the sensing elements in a non-read position corresponding to the fully extended position of the tray whereby the outer sensing fingers assume positions in electrical engagement with the blank column bus and the additional row conductor bus, the travel of the tray to an extended position causing the sensing elements to assume the secured non-read position and when the tray is positioned in the housing a sensing element will slide along the record member until one pair of sensing fingers engages a perforation in the corresponding column to thereby engage the respective row groove to cause the pair of sensing fingers at the opposite end to electrically engage the corresponding row bus when the tray is in a reading position, while a sensing element that does not engage a perforation remains in the secured non-read position to indicate a blank column, and means for locking and unlocking the tray into and out of a reading position.

4. A reader for a record member arranged with a preselected number of rows and columns and having information recorded thereon by perforations in a particular row and column as defined in claim 3, including means for latching said tray in a reading position.

5. A reader for a record member arranged with a preselected number of rows and columns and having information recorded thereon by perforations in a particular row and column as defined in claim 3 wherein said tray includes an additional groove arranged adjacent to and spaced from the innermost groove on the tray for detecting the absence of a record card in the tray or the presence of a record card having less than the preselected number of rows whereby when the tray is provided with a record card having less than the preselected number of rows or is not provided with a record card, the travel of the tray into the housing will cause the outer sensing fingers to engage the additional groove and the inner sensing fingers to engage an insulative portion of the tray to thereby indicate the abovementioned reading condition when the tray is in a reading position.

6. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended from the housing at least a distance to allow a record card to be positioned on the exposed portion of the tray, said tray being constructed of an electrically insulative material defined with a plurality of grooves on the exposed portion thereof corresponding to the number of rows on the record member to be read, and spaced apart a distance substantially equivalent to the spacing of the rows on the record member and further defined with a plurality of spaced row conductor bars corresponding to the plurality of rows arranged on the record member to be read and insulatively spaced apart a distance corresponding to the distance of the grooves, a supporting member mounted in the housing and spaced from the tray, said supporting member being defined with a plurality of guides corresponding to the number of columns of the record card to be read extending transversely to the row conductors and spaced apart a distance corresponding to the distance between the columns of the record card to be read and having an electrically isolated conductive portion substantially coextensive with each of the guides, a sensing element lifting element mounted on said supporting member transversely thereof for engaging row conductor bar ends of a sensing element at least a single electrically conductive sensing element including a sensing finger spaced on opposite sides of a substantially central portion arranged in forced electrical contact with the conductive portion of one of said column guides and adapted to be guided by said column guides and to slide along said conductive portions, the inner of said sensing fingers including a camming surface adapted to engage said lifting element and to hold the corresponding finger in spaced relationship with the tray to releasably secure the sensing element in a non-read position corresponding to the fully extended position of the tray and in response to the continuous sliding movement of the tray into the housing the sensing element releases itself from the lifting element and slides along its column groove to cause the sensing finger at the opposite end to engage a row bus representative of the row having the sensed perforation upon positioning the tray within the housing.

7. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended outwardly from the housing a distance corresponding to the width of a record card having a predetermined number of rows thereon and to be positioned on the exposed portion of the tray, said tray being constructed of an electrically insulative material defined with a plurality of grooves on the exposed portion thereof corresponding to the number of rows on the record member to be read and having the grooves spaced apart a distance substantially equivalent to the spacing of the rows on the record member and further defined with a plurality of spaced row conductor bars corresponding to the plurality of rows on the record member to be read and insulatively spaced apart a distance corresponding to the distance between the grooves, a supporting member mounted in the housing and spaced from the tray, said supporting member being defined with a plurality of guides corresponding to a preselected number of columns of the record card to be read extending transversely to the row conductors and spaced apart a distance corresponding to the distance between the columns of the record card and each having an electrically isolated conductive portion substantially coextensive with the guides, and a plurality of electrically conductive sensing elements removably mounted in said guides for each column to be sensed, said sensing elements comprising a substantially centrally located column bus sensing finger and a pair of spaced sensing fingers arranged at opposite ends from said central sensing finger and spaced apart a distance corresponding to the distance between a row groove and the corresponding row bus, a camming surface arranged intermediate the central sensing fingers and at least the row bus sensing fingers, each of said sensing elements being arranged in forced electrical contact with the conductive portion of one of said column guides by means of said central sensing finger and slidable along the top surface of said tray under the guidance of said column guides, the supporting member being further defined with a blank column bus arranged in an insulative relationship with said column bus to engage the central sensing finger of the sensing element, and with electrically conductive means for engaging the camming surface to releasably lift the sensing elements in a non-read position corresponding to the fully extended position of the tray, the travel of the tray to an extended position causing the sensing elements to assume the secured non-read position and when the tray is slidably moved into the housing a sensing element will slide along the record member upon one pair of sensing fingers engaging a perforation in the corresponding column to thereby engage the respective row groove to cause the disengagement of the camming surface and the conductive means to allow the pair of sensing fingers at the opposite end to electrically engage the corresponding row bus when the tray is in a reading position, while a sensing element that does not engage a perforation remains in the secured non-read position to indicate a blank column.

8. A reader for a record member arranged with a preselected number of rows and columns and having information recorded thereon by perforations in a particular row and column, said reader being characterized by a plurality of electrically conductive bars spaced apart in accordance with the spacing of the columns on the record member to be read and a plurality of electrically conductive bars spaced apart in accordance with the spacing of the rows on the record member to be read and spaced from the column conductor bars and arranged to extend transversely relative thereto, a plurality of electrical conductive sensing elements corresponding to the number of columns on a record member to be read and normally maintained in a non-read position, the sensing elements including spaced sensing portions separately engageable with a row and column conductor bar and a perforation in the record member to provide a continuous electrical circuit through a row and column bus and the sensing element for indicating the row and column of a sensed perforation when moved into a perforation reading position, a movable tray for receiving a record member and cooperable with the sensing elements to present the record member thereto whereby the engagement of the perforation sensing portion with a perforation causes the sensing element to be moved from the non-read position to a reading position to place the other sensing portions into electrical engagement with a row and column conductor bar corresponding to the location of the sensed perforations on the record member, said movable tray being defined with a record member reading portion and a record member insertion portion sequentially arranged thereon whereby a record member must be located on the reading portion to be correctly read, the card insertion portion including a hinged plate and yieldable means for normally urging the reading portion end of the plate slightly above the surface of the reading portion whereby a record member may be slipped onto the reading portion by depressing the plate and allowing the plate to assume its normal position when the record member is located on the reading portion and thereby prevent the record member from slipping back to the record member insertion portion.

9. A reader for a record member arranged with a preselected number of rows and columns and having information recorded thereon by perforations in a particular row and column as defined in claim 8 wherein the reading portion of the tray is constructed and defined with a plurality of spaced transverse grooves corresponding to the rows on the record member.

10. A reader for a record member arranged with a preselected number of rows and columns and having information recorded thereon by perforations in a particular row and column as defined in claim 8 wherein the reading portion of the tray includes means for subdividing the reading portion into a plurality of record member reading portions to allow the record members positioned at each portion to be simultaneously read.

11. A reader for a record member arranged with a preselected number of rows and columns and having information recorded thereon by perforations in a particular row and column and providing an electrical indication for each perforation recorded on the record member and indicating the particular row and column thereof, said reader having a base member, a housing connected to the base member, the combination of the housing and base member being arranged to define an opening, a record card receiving tray having a card reading station and a card indexing station defined thereon mounted on the base member for sliding movement relative to the base member and the housing whereby the indexing station and at least a portion of the card reading station extends inwardly and outwardly of the housing by means of the opening, said card indexing station comprising a hinged plate coextensive with the reading station, and yieldable means mounted on the tray for normally urging the indexing plate upwardly whereby the reading station end of the plate extends slightly above the surface of the reading station whereby a record member may be received and oriented on the indexing plate and slipped into the reading station by depressing the indexing plate and slipping the card into the reading station and then allowing the plate to assume is normal position to thereby prevent the record member from slipping back onto the indexing plate while the tray is located outside of the housing.

12. A reader for a record member arranged with a preselected number of rows and columns and having information recorded thereon by perforations in a particular row and column and providing an electrical indication for each perforation recorded on the record member and the particular row and column thereof, said reader having a base member, a housing connected to the base member, the combination of the housing and base member being arranged to define a throat, a record card receiving tray having a card reading station and a card indexing station defined thereon mounted on the base member for sliding movement relative to the base member and the housing whereby the indexing station and at least a portion of the card reading station extends inwardly and outwardly of the housing by means of the opening, said card indexing station comprising a hinged plate coextensive with the reading station, yieldable means mounted on the tray for normally urging the indexing plate upwardly whereby the reading station end of the plate extends slightly above the surface of the reading station, and stop means carried by the hinged plate to stop the upward extension of the plate, the surface of the throat spaced adjacent the indexing plate being defined for camming down the index plate to lie in substantially the same plane as the reading station to allow the tray to enter the housing, the other surface of the throat being defined as a stop for coaction with said stop means to limit the downward travel of the index plate.

13. A reader for a record member arranged with a preselected number of rows and columns and having information recorded thereon by perforations in a particular row and column and providing an electrical indication for each perforation recorded on the record member and the particular row and column thereof, said reader having a base member, a housing connected to the base member, the combination of the housing and base member being arranged to define a throat, a record card receiving tray having a card reading station and a card indexing station defined thereon mounted on the base member for sliding movement relative to the base member and the housing whereby the indexing station and at least a portion of the card reading station extends inwardly and outwardly of the housing by means of the opening, said card indexing station comprising a hinged plate coextensive with the reading station, yieldable means mounted on the tray for normally urging the indexing plate upwardly whereby the reading station end of the plate extends slightly above the surface of the reading station, and stop means carried by the hinged plate to stop the upward extension of the plate, the surface of the throat spaced adjacent the indexing plate being defined for camming down the index plate to lie in substantially the same plane as the reading station to allow the tray to enter the housing, the other surface of the throat being defined as a stop for coaction with said stop means to limit the downward travel of the index plate, said reading station having a stop defined at the inner end thereof whereby a record member may be constrained between the stop member and the extended end of the hinged plate while the index plate is outside of the housing.

14. A reader for a record member arranged with a preselected number of rows and columns and having information recorded thereon by perforations in a particular row and column, said reader being characterized by a plurality of electrically conductive bars spaced apart in accordance with the spacing of the columns on the record member to be read and a plurality of electrically conductive bars spaced apart in accordance with the spacing of the rows on the record member to be read and spaced from the column conductor bars and arranged to extend transversely relative thereto, a plurality of electrically conductive sensing elements corresponding to the number of columns on a record member to be read and normally maintained in a non-read position, the sensing elements including spaced sensing portions separately engageable with a row and column conductor bar and a perforation in the record member to provide a continuous electrical circuit through a row and column bus and the sensing element for indicating the row and column of a sensed perforation when moved into a perforation reading position, a movable tray for receiving a record member and cooperable with the sensing elements to present the record member thereto whereby the engagement of the perforation sensing portion with a perforation causes the sensing element to be moved from the non-read position to a reading position to place the other sensing portions into electrical engagement with a row and column conductor bar corresponding to the location of the sensed perforation on the record member, and a housing for the reader having a throat through which the slidable tray may be placed into and out of reading position, said movable tray having a card reading station and a card indexing station defined thereon whereby the indexing station and at least a portion of the card reading station extends inwardly and outwardly of the housing through the throat, said card indexing station comprising a hinged plate coextensive with the reading station, yieldable means mounted on the tray for normally urging the indexing plate upwardly whereby the reading station end of the plate extends slightly above the surface of the reading station, and stop means carried by the hinged plate to stop the upward extension of the plate, the surface of the throat spaced adjacent the indexing plate being defined for camming down the index plate to lie in substantially the same plane as the reading station to allow the tray to enter the housing, the other surface of the throat being defined as a stop for coaction with said stop means to limit the downward travel of the index plate.

15. A reader for a record member arranged with a preselected number of rows and columns and having information recorded thereon by perforations in a particular row and column, said reader being characterized by a plurality of electrically conductive bars spaced apart in accordance with the spacing of the columns on the record member to be read and a plurality of electrically conductive bars spaced apart in accordance with the spacing of the rows on the record member to be read and spaced from the column conductor bars and arranged to extend transversely relative thereto, a plurality of electrically conductive sensing elements corresponding to the number of columns on a record member to be read and normally maintained in a non-read position, the sensing elements including spaced sensing portions separately engageable with a row and column conductor bar and a perforation in the record member to provide a continuous electrical circuit through a row and column bus and the sensing element for indicating the row and column of a sensed perforation when moved into a perforation reading position, a movable tray for receiving a record member and cooperable with the sensing elements to present the record member thereto whereby the engagement of the perforation sensing portion with a perforation causes the sensing element to be moved from the non-read position to a reading position to place the other sensing portions into electrical engagement with a row and column conductor bar corresponding to the location of the sensed perforation on the record member, a housing for the reader having a throat through which the slidable tray may be located into and out of reading position, said movable tray having a card reading station and a card indexing station defined thereon whereby the indexing station and at least a portion of the card reading station extends inwardly and outwardly of the housing by means of the throat, said card indexing station comprising a hinged plate coextensive with the reading station, yieldable means mounted on the tray for normally urging the indexing plate upwardly whereby the reading station end of the plate extends slightly above the surface of the reading station, and stop means carried by the hinged plate to stop the upward extension of the plate, the surface of the throat spaced adjacent the indexing plate being defined for camming down the index plate to lie in substantially the same plane as the reading station to allow the tray to enter the housing, the other surface of the throat being defined as a stop for coaction with said stop means to limit the downward travel of the index plate, the card reading station being defined as an insulative surface having a plurality of spaced grooves corresponding to the number of rows on the record member for receiving the perforation sensing portion extending through a sensed perforation on the record member and a stop constructed adjacent the inner end of the reading station to arrest the movement of a record member as it is slipped off the index plate.

16. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended outwardly from the housing, a supporting member mounted in the housing and spaced from the tray, said supporting member carrying a printed circuit board having a plurality of spaced conductor bars corresponding to the number of columns on a record member to be read and a plurality of spaced row conductor bars arranged transversely thereto and spaced therefrom, said supporting member being further defined with a plurality of guides corresponding to the number of column conductor bars and spaced apart a distance corresponding to the distance between the columns of the record card, a plurality of electrically conductive sensing elements mounted in said guides under tension for each column to be sensed, said sensing elements comprising a substantially centrally located perforation sensing finger and a pair of spaced sensing fingers arranged at opposite ends from said central sensing element for providing an electrical cross-connection between a row bus and a column bus, each of said sensing elements carrying a magnetic element at one of said outer sensing fingers, the supporting member being further defined to mount a magnetic detent for releasably securing the sensing elements at the magnetic elements of each sensing finger in a non-read position corresponding to the fully extended position of the tray, the travel of the tray to an extended position causes the sensing elements to assume the secured non-read position and when the tray is positioned in the housing a sensing element will slide along the record member until a sensing finger engages a perforation in the corresponding column to cause the pair of sensing fingers at the opposite ends to electrically engage the corresponding row and column buses when the tray is in a reading position.

17. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended outwardly from the housing, a supporting member mounted in the housing and spaced from the tray, said supporting member carrying a printed circuit board having a plurality of spaced conductor bars corresponding to the number of columns on a record member to be read and a plurality of spaced row conductor bars arranged transversely thereto and spaced therefrom, said supporting member being further defined with a plurality of guides corresponding to the number of column conductors bars and spaced apart a distance corresponding to the distance between the columns of the record card, a plurality of electrically conductive sensing elements mounted in said guides under tension for each column to be sensed, said sensing elements comprising a substantially centrally located perforation sensing finger and a pair of spaced sensing fingers arranged at opposite ends from said central sensing finger for providing an electrical cross-connection between a row bus and a column bus, each of said sensing elements carrying a magnetic element at one of said outer sensing fingers, the supporting member being further defined to mount a magnetic detent for releasably securing the sensing elements at the magnetic elements of each sensing finger in a non-read position corresponding to the fully extended position of the tray, the travel of the tray to an extended position causes the sensing elements to assume the secured non-read position and when the tray is positioned in the housing a sensing element will slide along the record member until a sensing finger engages a perforation in the corresponding column to cause the pair of sensing fingers at the opposite ends to electrically engage the corresponding row and column buses when the tray is in a reading position, said movable tray being defined with a record member reading portion and a record member insertion portion sequentially arranged thereon whereby a record member must be located on the reading portion to be correctly read, the card insertion portion including a hinged plate and yieldable means for normally urging the reading portion end of the plate slightly above the surface of the reading portion whereby a record member may be slipped onto the reading portion by depressing the plate and allowing the plate to assume its normal position when the record member is located on the reading portion and thereby prevent the record member from slipping back to the record member insertion portion.

18. A reader for a record member arranged with a preselected number of rows and columns and having information recorded thereon by perforations in a particular row and column, including, in combination, a base member, a housing connected to the base member, a record card receiving tray mounted for sliding movement relative to the base member and adapted to be slidably extended outwardly from the housing, a supporting member mounted in the housing and spaced from the tray, said supporting member carrying a printed circuit board having a plurality of spaced conductor bars corresponding to the number of columns on a record member to be read and a plurality of spaced row conductor bars arranged transversely thereto and spaced therefrom, said supporting member being further defined with a plurality of guides corresponding to the number of column conductor bars and spaced apart a distance corresponding to the distance between the columns of the record card, a plurality of electrically conductive sensing elements mounted in said guides under tension for each column to be sensed, said sensing elements comprising a substantially centrally located perforation sensing finger and a pair of spaced sensing fingers arranged at opposite ends from said central sensing element for providing an electrical cross-connection between a row bus and a column bus, each of said sensing elements carrying a magnetic element at one of said outer sensing fingers, the supporting member being further defined to mount a magnetic detent for releasably securing the sensing elements at the magnetic elements of each sensing finger in a non-read position corresponding to the fully extended position of the tray, the travel of the tray to an extended position causes the sensing elements to assume the secured non-read position and when the tray is positioned in the housing a sensing element will slide along the record member until a sensing finger engages a perforation in the corresponding column to cause the pair of sensing fingers at the opposite ends to electrically engage the corresponding row and column buses when the tray is in a reading position, a record card receiving tray having a card reading station and a card indexing station defined thereon mounted on the base member for sliding movement relative to the base member and the housing whereby the indexing station and at least a portion of the card reading station extends inwardly and outwardly of the housing by means of the opening, said card indexing station comprising a hinged plate coextensive with the reading station, yieldable means mounted on the tray for normally urging the indexing plate upwardly whereby the reading station end of the plate extends slightly above the surface of the reading station, and stop means carried by the hinged plate to stop the upward extension of the plate, the surface of the throat spaced adjacent the indexing plate being defined for camming down the index plate to lie in substantially the same plane as the reading station to allow the tray to enter the housing, the other surface of the throat being defined as a stop for coaction with said stop means to limit the downward travel of the index plate.

References Cited

UNITED STATES PATENTS 2,869,790 1/1959 Radke et al. ______ 235—61.113

MAYNARD R. WILBUR, *Primary Examiner.*

L. W. MASSEY, D. W. COOK, *Assistant Examiners.*